(12) United States Patent
Constantinou

(10) Patent No.: US 11,122,847 B2
(45) Date of Patent: Sep. 21, 2021

(54) ARTICLE WITH UV RADIATION CURABLE MATERIAL ADHERED TO TEXTILE AND METHOD OF MAKING THE SAME

(71) Applicant: NIKE, Inc., Beaverton, OR (US)

(72) Inventor: Jay Constantinou, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 108 days.

(21) Appl. No.: 15/959,544

(22) Filed: Apr. 23, 2018

(65) Prior Publication Data

US 2018/0303203 A1 Oct. 25, 2018

Related U.S. Application Data

(60) Provisional application No. 62/488,971, filed on Apr. 24, 2017.

(51) Int. Cl.
*B29D 35/14* (2010.01)
*A41D 31/18* (2019.01)
(Continued)

(52) U.S. Cl.
CPC .............. *A41D 31/185* (2019.02); *A43B 1/14* (2013.01); *A43B 13/04* (2013.01); *A43B 23/025* (2013.01);
(Continued)

(58) Field of Classification Search
CPC . A43B 23/0215; B29C 65/10; B29C 65/1406; B29C 65/72; B29C 66/1122;
(Continued)

(56) References Cited

U.S. PATENT DOCUMENTS 2,684,305 A 7/1954 Quinlivan
3,250,840 A * 5/1966 Procopio ................ C08G 18/10
264/175
(Continued)

FOREIGN PATENT DOCUMENTS

CN 1085756 A 4/1994
CN 102529287 A 7/2012
(Continued)

OTHER PUBLICATIONS

International Search Report for PCT/US2018/028812 dated Jul. 10, 2018.
(Continued)

*Primary Examiner* — Daniel McNally
(74) *Attorney, Agent, or Firm* — Thomas|Horstemeyer, LLP

(57) ABSTRACT

An article of apparel, sporting equipment, or footwear incorporates a component formed of a UV radiation curable material. In the case of an article of footwear, the UV radiation curable material may be formed into an outsole. The method of manufacturing such articles includes shaping one or more pieces of an ultraviolet (UV) radiation curable material; placing the shaped UV radiation curable material in direct contact with a surface of a textile; using heat or pressure or both to adhere the shaped UV radiation curable material to the surface of the textile, and curing at least a portion of the shaped UV radiation curable material adhered to the surface of the textile by exposing the shaped UV radiation curable material to ultraviolet (UV) radiation, thereby forming an article comprising UV radiation cured material bonded to the surface of the textile.

17 Claims, 17 Drawing Sheets

(51) Int. Cl.

| | | |
|---|---|---|
| *A43B 23/02* | (2006.01) | |
| *D04B 1/24* | (2006.01) | |
| *D04B 21/20* | (2006.01) | |
| *B32B 5/02* | (2006.01) | |
| *B32B 27/12* | (2006.01) | |
| *B32B 27/40* | (2006.01) | |
| *A43B 1/14* | (2006.01) | |
| *B29D 35/00* | (2010.01) | |
| *B29C 65/00* | (2006.01) | |
| *B29C 65/72* | (2006.01) | |
| *B29C 65/10* | (2006.01) | |
| *B29C 65/14* | (2006.01) | |
| *A43B 13/04* | (2006.01) | |
| *B29C 35/08* | (2006.01) | |
| *B29K 75/00* | (2006.01) | |
| *B29L 31/50* | (2006.01) | |

(52) U.S. Cl.
CPC ...... *A43B 23/0215* (2013.01); *A43B 23/0235* (2013.01); *B29C 65/10* (2013.01); *B29C 65/1406* (2013.01); *B29C 65/72* (2013.01); *B29C 66/1122* (2013.01); *B29C 66/5326* (2013.01); *B29C 66/729* (2013.01); *B29C 66/73751* (2013.01); *B29C 66/82661* (2013.01); *B29D 35/0054* (2013.01); *B29D 35/146* (2013.01); *B32B 5/026* (2013.01); *B32B 27/12* (2013.01); *B32B 27/40* (2013.01); *D04B 1/24* (2013.01); *D04B 21/207* (2013.01); *B29C 35/0805* (2013.01); *B29C 66/71* (2013.01); *B29C 2035/0827* (2013.01); *B29K 2075/00* (2013.01); *B29K 2713/00* (2013.01); *B29L 2031/50* (2013.01); *B29L 2031/504* (2013.01); *B32B 2437/02* (2013.01); *D10B 2501/043* (2013.01)

(58) Field of Classification Search
CPC .............. B29C 66/5326; B29C 66/729; B29C 66/73751; B29C 66/82661
See application file for complete search history.

(56) References Cited

U.S. PATENT DOCUMENTS

| | | | |
|---|---|---|---|
| 5,275,372 A | 1/1994 | Boeckeler | |
| 5,389,176 A * | 2/1995 | Nakanishi | A43B 1/0036 |
| | | | 156/242 |
| 5,632,057 A | 5/1997 | Lyden | |
| 5,763,049 A | 6/1998 | Frey et al. | |
| 6,551,531 B1 | 4/2003 | Ford et al. | |
| 7,695,668 B2 | 4/2010 | Takahashi et al. | |
| 7,732,513 B2 | 6/2010 | Jimbo | |
| 8,109,757 B1 | 2/2012 | Fusi, III | |
| 8,344,070 B2 | 1/2013 | Squire et al. | |
| 8,398,903 B2 | 3/2013 | Hagmann et al. | |
| 2002/0018281 A1 | 2/2002 | Theiste et al. | |
| 2004/0004300 A1 | 1/2004 | Yamaguchi et al. | |
| 2004/0087754 A1* | 5/2004 | Foley | C08G 18/757 |
| | | | 528/59 |
| 2004/0143034 A1 | 7/2004 | Primke et al. | |
| 2005/0056954 A1 | 3/2005 | Devlin et al. | |
| 2006/0194707 A1 | 8/2006 | Lu | |
| 2007/0204482 A1* | 9/2007 | Gibson-Collinson | |
| | | | A43D 25/07 |
| | | | 36/10 |
| 2008/0033112 A1 | 2/2008 | Squire et al. | |
| 2009/0302507 A1 | 12/2009 | Tsunozaki et al. | |
| 2012/0021151 A1 | 1/2012 | Tatarka et al. | |
| 2013/0134636 A1 | 5/2013 | Schneider et al. | |
| 2014/0020192 A1 | 1/2014 | Jones et al. | |
| 2014/0310986 A1* | 10/2014 | Tamm | D04B 1/16 |
| | | | 36/84 |
| 2014/0320986 A1 | 10/2014 | You | |
| 2016/0021969 A1* | 1/2016 | Lettow, II | A43B 1/14 |
| | | | 36/87 |
| 2016/0103255 A1 | 4/2016 | Powell et al. | |
| 2016/0227876 A1 | 8/2016 | Le et al. | |
| 2016/0295971 A1* | 10/2016 | Arnese | B29D 35/0009 |
| 2016/0362552 A1* | 12/2016 | Reichel | B29C 48/022 |
| 2019/0329457 A1 | 10/2019 | Miyake et al. | |

FOREIGN PATENT DOCUMENTS

| | | |
|---|---|---|
| CN | 103561929 B | 2/2014 |
| CN | 104859277 A | 8/2015 |
| CN | 106418874 A | 2/2017 |
| DE | 19753863 A1 | 6/1998 |
| EP | 137888 A2 | 4/1985 |
| EP | 1378898 A1 | 1/2004 |
| EP | 1434211 A1 | 6/2004 |
| EP | 1484148 A1 | 12/2004 |
| EP | 1872924 A1 | 1/2008 |
| EP | 2441338 A2 | 4/2012 |
| EP | 2671703 A2 | 12/2013 |
| EP | 2838708 A2 | 2/2015 |
| EP | 3053732 A1 | 8/2016 |
| JP | H0345902 A | 2/1991 |
| JP | 2000108137 A | 4/2000 |
| WO | 200706652 A1 | 1/2007 |
| WO | 201217008 A1 | 2/2012 |
| WO | 201217008 A1 | 12/2012 |
| WO | 2014015033 A2 | 1/2014 |
| WO | 2016089462 A1 | 6/2016 |
| WO | 2017007533 A1 | 1/2017 |

OTHER PUBLICATIONS

International Search Report for PCT/US2018/028815 dated Jul. 24, 2018.
International Search Report for PCT/US2018/028817 dated Jul. 24, 2018.
International Search Report for PCT/US2018/028814 dated Sep. 6, 2018.
International Preliminary Report on Patentability for PCT/US2018/028815 dated Jul. 8, 2019.
Written Opinion of the International Preliminary Examining Authority for PCT/US2018/028815 dated Apr. 23, 2019.
International Preliminary Report on Patentability for PCT/US2018/028817 dated May 8, 2019.
International Preliminary Report on Patentability for PCT/US2018/028812 dated Aug. 7, 2019.
International Preliminary Report on Patentability for PCT/US2018/028814 dated May 8, 2019.
Written Opinion of the International Preliminary Examining Authority for PCT/US2018/028812 dated Mar. 7, 2019.
Topas: Cycloolefin Copolymer (COC) Brochure. TOPAS Advanced Polymers. Retrieved online Jan. 11, 2021 from https://topas.com/sites/default/files/files/topas_product-brochure_english.pdf. Published 2008. (Year: 2008).

* cited by examiner

ARTICLE WITH UV RADIATION CURABLE MATERIAL ADHERED TO TEXTILE AND METHOD OF MAKING THE SAME

CROSS-REFERENCE TO RELATED APPLICATIONS

This application claims priority to U.S. Provisional Application No. 62/488,971 filed Apr. 24, 2017, the entire content of which is incorporated herein by reference.

FIELD

This disclosure relates generally to articles of apparel or sporting equipment, such as garments and footwear that comprise a component formed from an ultraviolet (UV) radiation curable material.

BACKGROUND

The statements in this section merely provide background information related to the present disclosure and may not constitute prior art.

Conventional articles of footwear normally include both an upper and sole structure. The upper generally forms an interior void that securely and comfortably receives a foot. The sole structure may be secured to the upper and is generally positioned between the foot and the ground. This sole structure may attenuate ground reaction forces, provide traction, as well as limit potentially harmful foot motion. Accordingly, the upper and sole structure operate together to provide a comfortable structure that is well suited for use in a wide variety of activities.

The sole structure generally comprises an outsole, and optionally, one or more of an insole or midsole. The outsole forms the element of the sole structure that makes contact with the ground and is usually fashioned from a durable and wear-resistant elastomeric material that may include a tread pattern to impart traction. When present, the insole represents a thin, compressible member that is typically located within the void of the upper and adjacent to the foot in order to enhance comfort. In addition, a midsole may optionally be included as a middle layer in the sole structure located between the outsole and the upper or the insole, when present. The purpose of a midsole is to assist in the attenuation of ground reaction forces.

Despite the various models and characteristics available with conventional footwear, new footwear models and constructions are continually desired to provide further development and advancement in the art.

DRAWINGS

In order that the disclosure may be well understood, there will now be described various forms thereof, given by way of example, reference being made to the accompanying drawings, in which.

Figure 1A:
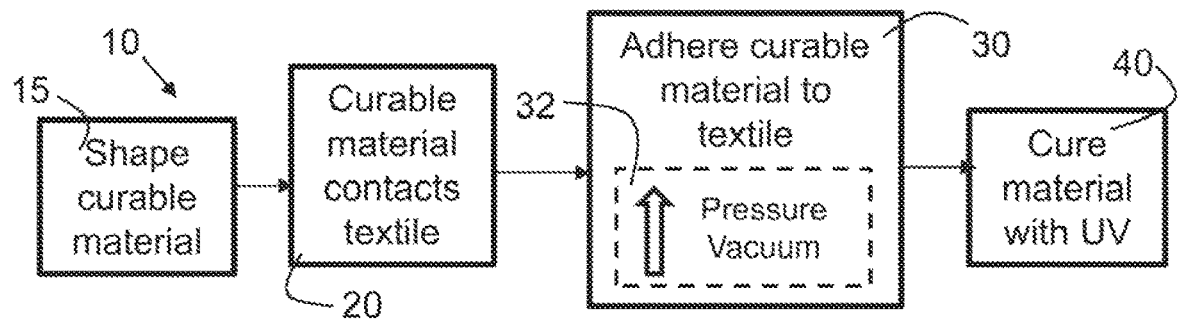
FIG. 1A is a flow chart of a method of manufacturing an article according to the teachings of the present disclosure.

The drawings described herein are for illustration purposes only and are not intended to limit the scope of the present disclosure in any way.

DETAILED DESCRIPTION

The present disclosure generally provides a method of forming an article of apparel or sporting equipment, such as garments and footwear that incorporates a component formed of an ultraviolet radiation (UV) curable material. The present disclosure also describes articles comprising a textile, and a shaped portion of a UV radiation cured material directly bonded to a surface of the textile. UV radiation curable materials can be used to form a durable portion of an article of apparel or sporting equipment, such as a portion of an interior or exterior surface of the article. For example, shaped portions of UV radiation curable elastomers can be adhered to and cured in contact with a textile without exposing the textile to the high temperatures and pressures which would be required to adhere conventional rubber to a textile in a vulcanization process.

The method of manufacturing such articles includes placing UV curable material in contact with a surface of a textile; using heat or pressure or both, to conform the UV radiation curable material to the contour or shape of the textile; adhering the UV radiation curable material to the surface of the textile; and exposing at least a portion of the UV radiation curable material to ultraviolet (UV) radiation. In the case of an article of footwear, the UV radiation curable material may be formed into an outsole and the textile may take the form of an upper. Alternatively or additionally, the UV radiation curable material may be applied as a layer covering all or a portion of an upper for an article of footwear. In one example, the upper may include an elastomeric element that at least partially encloses an interior void that is configured to receive a foot, including but not limited to a bootie-like or sock-like upper. The UV radiation curable material may be exposed to the UV radiation in an amount and for a duration that is sufficient to partially cure or fully cure the UV radiation curable material. The use of these methods allows the manufacture of durable articles without the need for expensive tooling. The use of these methods also allows the direct bonding of materials to textiles without the need to expose the textiles to elevated temperatures for significant durations of time, as is required in vulcanization processes. Furthermore, the articles disclosed herein include regions in which the UV radiation curable material is bonded directly to a textile, without the need for adhesives or primer, thus eliminating the need for adhesives which may include toxic solvents.

Further areas of applicability will become apparent from the description provided herein. It should be understood that the description and specific examples are intended for purposes of illustration only and are not intended to limit the scope of the present disclosure.

The following description is merely exemplary in nature and is in no way intended to limit the present disclosure or its application or uses. For example, the molded article or a component thereof comprising an ultraviolet (UV) curable material made and used according to the teachings contained herein is described throughout the present disclosure in conjunction with footwear in order to more fully illustrate the composition and the use thereof. The incorporation and use of such a molded UV radiation curable article or component thereof in other applications, including apparel such as garments, sporting equipment, or the like, as well as components thereof, are contemplated to be within the scope of the present disclosure. It should be understood that throughout the description, corresponding reference numerals indicate like or corresponding parts and features.

The present disclosure generally provides a method of forming an article that includes or incorporates a UV radiation curable material. Referring to FIG. 1A, this method 10 comprises shaping one or more pieces of the UV radiation curable material 15. The shaped UV radiation curable material may be placed in direct contact 20 with a surface or side of a textile. The shaped UV radiation curable material is adhered to the surface of the textile using heat, pressure, or a combination thereof 30. After the shaped UV radiation curable material adheres 30 to the surface of the textile, at least a portion of the shaped UV radiation curable material that is adhered to the textile is cured by exposing the shaped UV radiation curable material to ultraviolet (UV) radiation, thereby forming an article that comprises UV radiation cured material bonded to the surface of the textile 40. Following the curing, in some examples, a bond strength of the UV radiation cured material bonded to the textile is at least 10% greater than a bond strength of the shaped UV radiation curable material adhered to the textile prior to the curing. Alternatively, the bond strength after curing is at least 15% greater than before curing; or is at least 20% greater than before curing.

An interface between the UV radiation curable material and the surface of the textile is created upon the adherence of one to the other. The interface between the adhered UV radiation curable material and the surface of the textile may be substantially free of additional materials. For example, the interface between the UV radiation curable material and the surface of the textile may be substantially free of adhesive materials, or primers, or both.

Figure 1B:
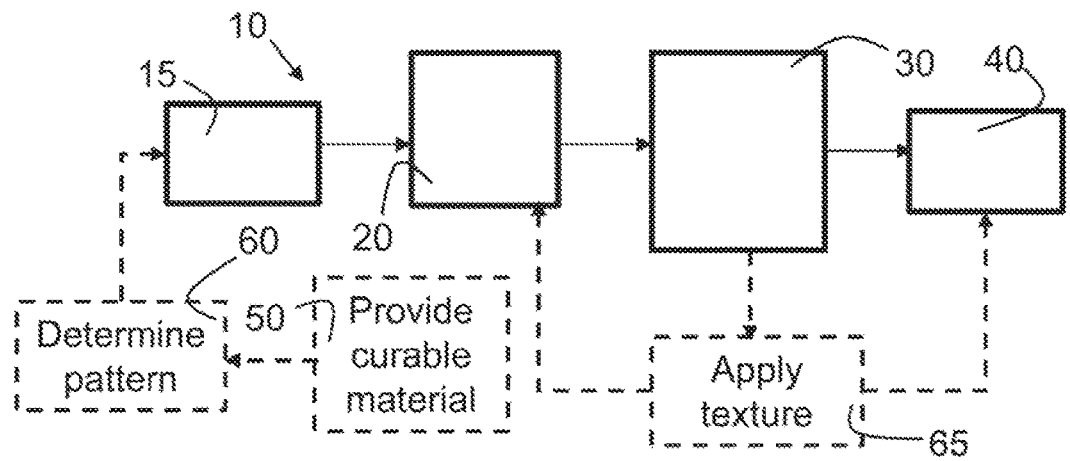
FIGS. 1B-1E are flow charts of optional steps associated with the method of FIG. 1A.

Referring now to FIG. 1B, the step of shaping the one or more pieces of the UV radiation curable material comprises providing an ultraviolet (UV) radiation curable material in the form of one or more flat pieces 50 and shaping the UV radiation curable material. For example, the shaping can include shaping the UV radiation curable material such that it resembles a pattern piece 60. This pattern piece may have a predetermined shape.

The determination of at least one pattern piece having a predetermined shape 60 may be accomplished using a printed pattern piece that can be placed onto the flat piece of the UV radiation curable material to provide an outline of the pattern piece to which the UV radiation curable material will be shaped. The pattern piece may also be generated 60 using a computer program that can communicate with a mechanical device, including without limitation, a laser cutter, capable of cutting or trimming the flat piece of UV radiation curable material to the shape of the pattern piece.

Still referring to FIG. 1B, when desirable a texture may be applied 65 to a surface of the one or more pieces of UV radiation curable material, to the shaped UV radiation curable material, to the adhered UV radiation curable material, or any combination thereof prior the curing step. This texture may be applied on the side of the UV radiation curable material (e.g., inner surface) that directly contacts the textile in order to enhance adhesion therewith. This texture may also be applied on the side of the UV radiation curable material that does not make contact with the textile (e.g., outer surface) in order to provide a decorative design, a visual effect or enhance physical properties, such as, without limitation, the coefficient of friction, abrasion resistance, or the like. The outer surface of the UV radiation cured material may constitute at least a portion of an exterior surface of the article. The texture may be applied to the surface of the UV radiation curable material either before or after the material is adhered to the textile. Alternatively, the texture is applied after the UV radiation curable material is adhered to the textile. The texture may be applied to the surface of the UV radiation curable material prior to the UV radiation curable material being exposed to the ultraviolet (UV) radiation.

The process of applying the texture 65 to the surface of the UV radiation curable material may comprise providing a textured element having a texture located on at least one surface thereof and placing the textured surface of the textured element in contact with the surface of the UV radiation curable material. Alternatively, the textured element is placed in contact with the outer surface of the UV radiation curable material. The shape of the texture may be pulled or drawn into the surface of the UV radiation curable material. When desirable, additional force may be applied to push the shape of the texture into the UV radiation curable material. The textured element may be removed from the UV radiation curable material prior to curing or after at least partial curing of the UV radiation curable material.

The textured element may include, without limitation, an elastomeric element, such as a sheet, a release paper, the surface of a mold, or a bootie that fits over the combination of the textile and the shaped UV radiation curable material. Thus according to one aspect of the present disclosure, a textured elastomeric element may be placed over at least a portion of the UV radiation curable material and the textile. The textured elastomeric element may be removed after the UV radiation curable material adheres to the textile, or after at least partially curing the UV radiation curable material.

Any noticeable defects in the shaped or contoured UV radiation curable material may be repaired 70. These repairs may include, but not be limited to, holes, scratches, blemishes, inclusions, cloudiness, blisters, and the like. The step of repairing any defects 70 in the shaped UV radiation curable material may include identifying one or more defects; forming a patch made of the UV radiation curable material; and applying the patch to the defect. Optionally, the defect may be removed by cutting or trimming around the defect prior to the application of the patch.

Figure 1C:
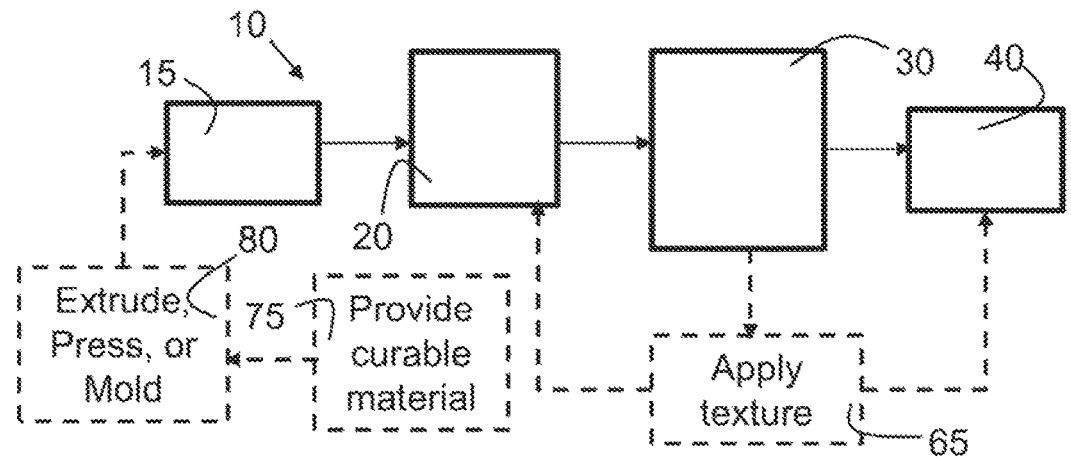

Referring now to FIG. 1C, the UV radiation curable material be obtained as flat pieces or sheets through a commercial source or formed into such pieces prior to use. The shaping 15 of the UV radiation curable material may include providing a predetermined amount of UV radiation curable material 75 and either extruding, molding, or pressing the material into the one or more flat pieces 80 using heat, pressure, or a combination thereof. The UV radiation curable material may be extruded, molded, or pressed into flat pieces having a thickness that is between about 0.5 millimeters (mm) and about 3 mm; alternatively, between about 1 mm to about 2 mm.

When more than one flat piece of UV radiation curable material is present, the pieces may have the same or different thicknesses and/or surface areas. For example, when two flat pieces of the UV radiation curable material is provided the thickness of the first flat piece may be greater than the thickness of the second flat piece. For example, if the thickness of the first flat piece is about 2 mm, the thickness of the second flat piece may be at least 2.1 mm; alternatively, at least 2.2 mm; alternatively, at least 2.5 mm; alternatively, about 3 mm.

The surface area of the second flat piece may also be greater than the surface area of the first flat piece. In general, each flat piece will have at least a first and second surface representing the flat surfaces located opposite one another, e.g., top and bottom surface, on the UV radiation curable material. In this case, the surface area of the second flat piece may be at least 5% greater than the surface of the first flat piece; alternatively, at least 10% greater; alternatively, at least 25% greater; alternatively, at least 50% greater.

The first surface of the first flat piece may be placed in direct contact with the surface of the textile with the second flat piece being placed on top of the first flat piece. The first surface of the second flat piece may be placed in direct contact with the second surface of the first flat piece, the second surface of the first flat piece being opposite the first surface of the first flat piece. The second surface of the second flat piece forms at least a portion of an outer surface of the article, so that the second surface of the second flat piece is opposite the first surface of the second flat piece.

Referring once again to FIG. 1B, when more than one flat piece of UV radiation curable material is present, the shape of the flat pieces may be the same or different. According to one aspect of the present disclosure, the step of determining the pattern 60 may comprise creating a first pattern and a second pattern, wherein the first pattern is different from the second pattern. The first flat piece of UV radiation curable material may be shaped 15 to resemble the first pattern, while the second flat piece of UV radiation curable material may be shaped to resemble the second pattern.

According to another aspect of the present disclosure, the first flat piece of UV radiation curable material may be placed in contact with the textile forming a first layer. The second flat piece of UV radiation curable material may be placed such that a portion of the second flat piece covers at least part of the first layer, thereby, forming a second layer. At least part of the second layer makes direct contact with the textile. One or more edges of the first layer may be blended together with the second layer, such that a smooth transition exists between the first and second layers.

Referring again to FIG. 1A, the step of adhering 15 the shaped UV radiation curable material to the textile may comprise increasing a temperature of at least a portion of the shaped UV radiation curable material while the shaped UV radiation curable material is in contact with the textile. The amount of heat applied to the UV radiation curable material is generally maintained between about ambient or room temperature and less than 170° C. Alternatively, the temperature may range between about 40° C. and about 165° C. The UV radiation curable material softens within this predetermined temperature range, such that the UV radiation curable material can be contoured or shaped as desired to conform to the shape of the molding surface. The temperature of the UV radiation curable material is generally reduced to a point wherein the material is no longer softened prior to the exposing the UV radiation curable material to ultraviolet (UV) radiation.

This step 15 of adhering the shaped UV radiation curable material to the textile may also comprise subjecting at least a portion of the shaped UV radiation curable material to increased pressure and/or vacuum while the shaped UV radiation curable material is in contact with the textile. The pressure that is applied to the UV radiation curable material is generally between about 2 kgf/cm$^2$ (~28 psi) to about 200 kgf/cm$^2$ (~2,800 psi). Alternatively, the amount of pressure applied ranges from about 3 kfg/cm$^2$ (~40 psi) to about 6 kfg/cm$^2$ (~80 psi); alternatively, between about 6 kfg/cm$^2$ (~80 psi) to about 35 kfg/cm$^2$ (~500 psi); and alternatively, between about 35 kfg/cm$^2$ (~500 psi) to about 150 kfg/cm$^2$ (~2,100 psi)

For the purpose of this disclosure the terms "about" and "substantially" are used herein with respect to measurable values and ranges due to expected variations known to those skilled in the art (e.g., limitations and variability in measurements).

For the purpose of this disclosure any range in parameters that is stated herein as being "between [a $1^{st}$ number] and [a $2^{nd}$ number]" or "between [a $1^{st}$ number] to [a $2^{nd}$ number]" is intended to be inclusive of the recited numbers. In other words the ranges are meant to be interpreted similarly as to a range that is specified as being "from [a $1^{st}$ number] to [a $2^{nd}$ number]".

Figure 1D:
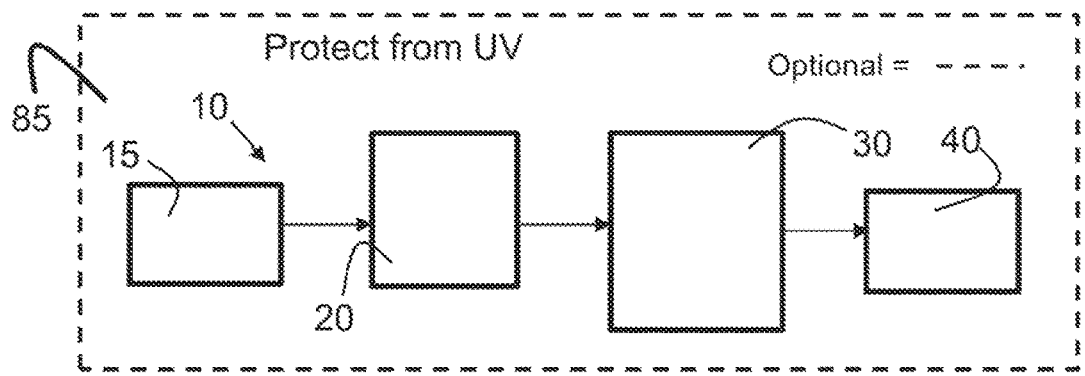

Referring now to FIG. 1D, when desirable, various precautions or safeguards may be undertaken by one skilled in the art in order to protect 85 at least a portion of the UV radiation curable material from being exposed to UV radiation during one or more steps of the method. Such precautions or safeguards may include, but not be limited to, masking a portion of the UV radiation curable material or the surface upon which the material is in contact, as well as maintaining the UV radiation curable material in an environment that is absent any UV/visible light.

The surface against which the UV radiation curable material is placed when forming the flat pieces or sheet may be a single substantially planar surface or incorporated as part of a press, a compression mold, a mold used in an injection molding process, or a part used in any other known forming process, such as cast molding, thermoforming or vacuum forming, to name a few. The surface against which the UV radiation curable material is placed may be entirely or at least partially smooth or textured. The texturing of the surface may be done in a manner that provides the surface of the flat pieces or sheet with a greater degree of roughness or the formation of irregularities that will enhance the ability to bond a surface of another material or component thereto. This bonding or adherence may be accomplished with or without the use of an adhesive or cement. The texturing of the surface may also be done in order to impart a visible design or pattern to the surface of the sheet or flat pieces.

Referring once again to FIG. 1C, when applying the texture 65 to the surface of the one or more pieces of UV radiation curable material, to the shaped UV radiation curable material, to the adhered UV radiation curable material, or any combination thereof may comprise providing a texture element having a textured surface; placing the textured surface of the textured element in contact with the surface of the one or more pieces of UV radiation curable material, shaped UV radiation curable material, adhered UV radiation curable material; and pulling the shape of the texture into the surface of the one or more pieces. Optionally, a force may further be applied in order to push the shape of the texture into the surface of the one or more pieces. Alternatively, applying the texture to the surface of the adhered UV radiation curable material occurs after the adhering step 30.

Figure 1E:
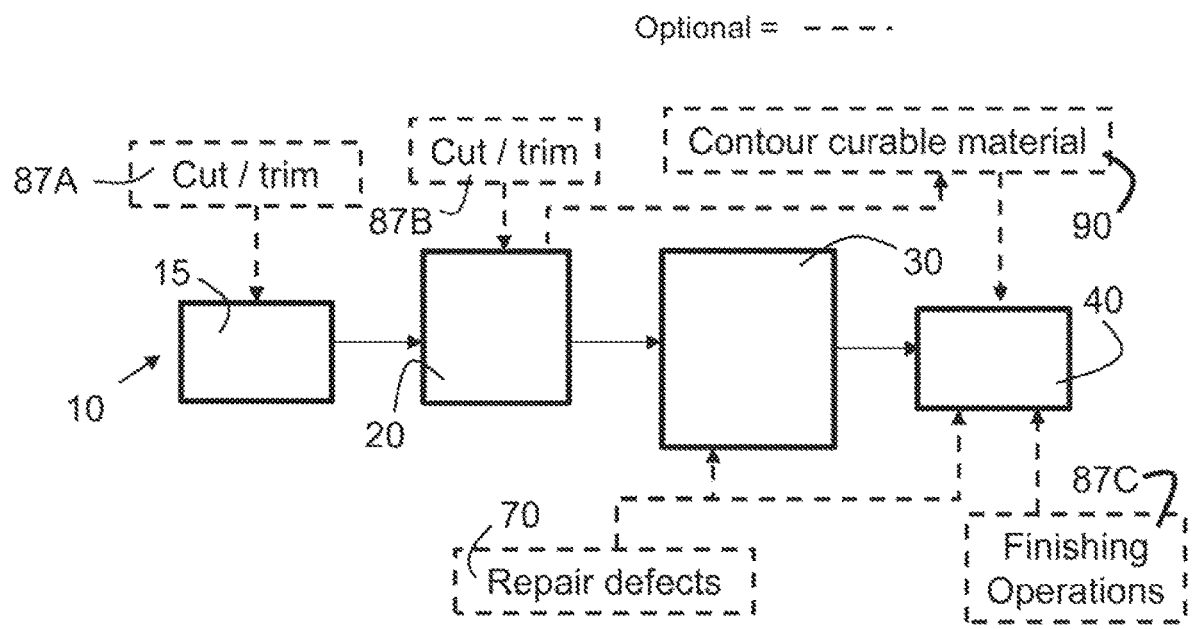

Referring now to FIG. 1E, the UV radiation curable material may also be subjected to cutting or trimming in order to shape the UV radiation curable material 87A, such that it resembles the desired pattern. In addition, any excess material or unnecessary material may further be cut or trimmed after the shaped material is placed in contact with the surface of the textile 87B. Additional UV material may also be trimmed or cut from the article as part of a finishing operation 87C. In this case, the cutting or trimming of the article may be performed after exposure to the UV radiation. Other finishing operations, which include but are not limited to, polishing embossing, steaming/ironing, brushing, or decorative stitching, to name a few can also be performed on the article without exceeding the scope of the present disclosure.

Still referring to FIG. 1E, after the UV radiation curable material is placed in direct contact with a surface of a textile and adhered thereto 30, the shaped UV radiation curable material, textile and/or an adhered combination thereof may be contoured 90 to a predetermined shape. This contouring step 90 is generally done prior to curing 40. This contouring step 90 may include, without limitation, at least one of pulling ends of the shaped UV radiation curable material or the adhered UV radiation curable material together, pinching ends of the shaped UV radiation curable material together; press seaming ends of the shaped UV radiation curable material or the adhered UV radiation curable material together; press seaming ends of the shaped UV radiation curable material or the adhered UV radiation curable material; and trimming away any excess shaped UV radiation curable material or the adhered UV radiation curable material, and combinations thereof. When desirable, this contouring step 90 may also comprise placing a first combination of the shaped UV radiation curable material and the textile on a contoured mechanical form or placing a second combination of the adhered UV radiation curable material the textile on a contoured mechanical form, and curing by exposing the at least a portion of the UV radiation curable material to the ultraviolet radiation while the first or second combination is on the contoured mechanical form. The mechanical form may be, without limitation, a shoe last.

The step of adhering 30 the UV radiation curable material to the textile may include, but not be limited to heating the UV radiation curable material while the UV radiation curable material is in contact with the textile and, optionally, increasing pressure or subjecting the UV radiation curable material to a vacuum 32. The use of a vacuum, either a partial vacuum or a full, i.e., perfect, vacuum may pull the UV radiation curable into closer or more intimate contact with the surface of the textile.

Once the UV radiation curable material adheres 30 to the surface of the textile, at least a portion of the UV radiation curable material may be cured by exposure to ultraviolet (UV) radiation 40, in an amount and for duration in time that is sufficient to at least partially cure the exposed portion of the UV radiation curable material. Alternatively, upon exposure to the UV radiation, the exposed portion of the UV radiation curable material may be fully or substantially cured. Alternatively, substantially all of the UV radiation curable material is exposed to the UV radiation and is at least partially cured; alternatively, fully cured.

For the purpose of this disclosure, the term "partially cured" is intended to denote the occurrence of at least about 1%, alternatively, at least about 5% of the total polymerization required to achieve a substantially full cure. The term "fully cured" is intended to mean a substantially full cure in which the degree of curing is such that the physical properties of the UV radiation curable material do not noticeably change upon further exposure to additional UV radiation.

The UV radiation curable material generally comprises one or more photopolymers or light-activated resins that will undergo a cross-linking reaction upon exposure to ultraviolet (UV) radiation. The UV radiation curable material may comprise a mixture of various multifunctional monomers, oligomers, and/or low molecular weight polymers or copolymers, along with one or more photoinitiator(s) that can undergo polymerization in the presence of UV radiation. Upon exposure to UV radiation, the photoinitiator decomposes into a reactive species that activates polymerization of specific functional groups that are present in the multifunctional oligomers, monomers, or polymers.

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polyurethane is interpreted to include one or more polymer molecules of the polyurethane, where the polymer molecules may or may not be identical (e.g., different molecular weights).

The end result of curing a light-activated resin in this manner is the formation of a thermoset or cross-linked polymer network. Thus the UV radiation curable material may be described as being an UV radiation curable elastomer. Alternatively, the UV radiation curable material may comprise an UV radiation curable rubber. The UV radiation curable material may comprise one or more thermoset polymers, thermoplastic polymers, or combinations thereof. When desirable, the one or more thermoplastic polymers may be one or more thermoplastic polyurethanes (TPU).

Several specific examples of various monomers that may be used in the UV radiation curable material include, but are not limited to, styrene and styrenic compounds, vinyl ethers, N-vinyl carbazoles, lactones, lactams, cyclic ethers, cyclic acetals, and cyclic siloxanes. Several specific examples of oligomers and low molecular weight polymers or copolymers that may be incorporated into the UV radiation curable material include, without limitation, epoxides, urethanes, polyethers, or polyesters, each of which provide specific properties to the resulting material. Each of these oligomers or polymers may be functionalized using an acrylate. Alternatively, the UV radiation curable material may include a mixture of urethane and acrylate oligomers or a copolymer thereof.

Photoinitiation may occur via a free radical mechanism, an ionic mechanism, or a combination thereof. Under an ionic mechanism, the polymerizable oligomers, monomers, or polymers are doped with either anionic or cationic photoinitiators. Several examples of such photoinitiators, include without limitation, onium salts, organometallic compounds, and pyridinium salts. In the free radical mechanism, the photoinitiators generate free-radicals by the abstraction of a hydrogen atom from a donor or co-initiator compound (i.e., a 2-component system), or by the cleavage of a molecule (i.e., a 1-component system). Several specific examples of abstraction type photoinitiators, include but are not limited to, benzophenone, xanthones, and quinones with common donor compounds being aliphatic amines. Several specific examples of cleavage-type photoinitiators include, without limitation, benzoin ethers, acetophenones, benzoyl oximes, and acylphosphines. Photocurable materials that form through the free-radical mechanism undergo chain-growth polymerization, which includes three basic steps: initiation, chain propagation, and chain termination. Alternatively, the photoinitiators are independently selected and may include phosphine oxides, benzophenones, a-hydroxyalkyl aryl ketones, thioxanthones, anthraquinones, acetophenones, benzoins and benzoin ethers, ketals, imidazoles, phenylglyoxylic acids, peroxides, and sulfur-containing compounds.

The amount of photoinitiators present in the UV radiation curable material is determined by the effective amount necessary to induce crosslinking of the UV radiation curable material. This amount may range from about 0.05 weight percent (wt. %) to about 5 wt. %, alternatively, from about 0.1 wt. % to about 2 wt. %, and alternatively, from about 0.2 wt. % to about 1 wt. % based on the weight of the UV radiation curable material. A single type of photoinitiator or a mixture of different photoinitiators may be used.

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

According to one aspect of the present disclosure, the UV radiation curable material may comprise, consist of, or consist essentially of a millable polyurethane gum that includes ethylenic unsaturation, one or more photoinitiators, and at least one additional crosslinking additive that comprise two or more ethylenically unsaturated groups. The millable polyurethanes may be prepared by the reaction of a di- or polyisocyanate with bis(hydroxyl)-functional compounds, at least one of which contains ethylenic unsaturation. Alternatively, unsaturated polyester polyols may be used, alone or in combination with other isocyanate-reactive components, such as polyoxyalkylene glycols and/or diols capable of providing pendent ethylenic unsaturation. A commercial example of such a UV radiation curable material is Millathane® UV (TSE Industries Inc., Clearwater, Fla.). Further description of such a UV radiation curable material is provided in U.S. Publication No. 2016/0362552, the entire content of which is hereby incorporated by reference.

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

The additional crosslinking additive present in the curable polyurethane composition may include any low molecular weight compounds that contain two or more ethylenically unsaturated groups. These unsaturated groups may include, without limitation, glycerol diallyl ether, 1,6-hexanediol di(meth)acrylate, triallylisocyanurate, trimethylolpropane di(meth)acrylate, trimethylolpropane tri(meth)acrylate, glycerol di(meth)acrylate, glycerol tri(meth)acrylate, propoxylated glycerol triacrylate, 1,2-divinyltetramethyldisiloxane, divinylbenzene, and the like. The molecular weight of this additional crosslinking additive may be less than about 2000 Da, alternatively less than about 1000 Da, alternatively less than about 500 Da. The concentration of the crosslinking additive in the UV radiation curable material is selected based upon the amount of ethylenic unsaturated groups that are desired. The concentration of this additive may range from about 0.01 wt. % to about 15 wt. %, alternatively, from about 1 wt. % to about 12 wt. %, and alternatively, from about 5 wt. % to about 10 wt. % based on the overall weight of the UV radiation curable material.

When desirable, the UV radiation curable material may optionally comprise one or more additional processing aids, including without limitation, plasticizers, mold release agents, lubricants, antioxidants, flame retardants, dyes, pigments, reinforcing and non-reinforcing fillers, fiber reinforcements, and light stabilizers or UV absorbers. When an UV absorber is incorporated into the UV radiation curable material in order to enhance the environmental stability thereof, it may be necessary or desirable to use a more powerful UV light source to achieve full cure of the material, or use an UV light source having an output wavelength that is in a range within the UV spectrum at which the UV absorber exhibits a reduced level of absorbance.

The reinforcing fillers that may optionally be incorporated into the UV radiation curable material may be organic, i.e. polymeric, or inorganic in nature. These fillers may exhibit a mean, weight average particle sizes that is 1 μm, alternatively, in the range between about 20 nanometers (nm) to about 500 nm. Several specific examples of reinforcing fillers include, but are not limited to, pyrogenic (i.e., fumed) metal oxides, such as alumina, titania, ceria, silica, and the like; colloidal metal oxides, such as colloidal alumina or silica; carbon black and acetylene black; metal hydroxides, such as aluminum hydroxide; glass or polymer microspheres; or limestone, talc, clay, and the like. The amount of filler present in the UV radiation curable material is selected based upon the requirements associated with a particular end use. Typically, the amount of reinforcing filler present in the UV radiation curable material ranges from 0 wt. % to about 20 wt. % based on the total weight of the UV radiation curable material. Fillers having the same chemical composition may be considered to be non-reinforcing fillers when their mean, weight average particle size is greater than 1 μm, alternatively, in the range of about 2 mm to about 500 mm.

The UV radiation curable material may be cured by irradiation with UV light transmitting a wavelength that is the same as the excitation wavelength exhibited by the photoinitiator present. The UV light may be produced from any known source, including without limitation, low, medium, or high pressure mercury vapor lamps, xenon lamps, quartz halogen lamps, or lasers operating in the short wavelength portion of the spectra, e.g., in the range of about 180 nm to about 400 nm. Several more specific examples of UV light sources include, but are not limited to, short-wave UV lamps, gas-discharge lamps, ultraviolet LEDs, UV lasers, tunable vacuum ultraviolet (VUV) obtained from sum and difference frequency mixing, or plasma and synchrotron sources of extreme UV radiation.

The duration in time that the UV radiation curable material is irradiated with UV radiation is variable and based upon the nature and type of reactive oligomers, monomers, or polymers present in the UV radiation curable material, as well as type and concentration of the crosslinking additives, photoinitiators, and fillers, as well as the type and power associated with the available UV light source. The duration of UV exposure may range less than a second to several hours; alternatively, the exposure time is between about 1 second and about 1 hour; alternatively, between about 5 seconds and 5 minutes. The UV radiation curable material may be irradiated at ambient or room temperature within the confines of a molding operation or at a temperature associated with the component formed in a molding or extrusion process. When desirable the molded part may be subjected to a cooling step prior to irradiation with UV light. Although, no thermal cure is necessary, a dual cure system may be used when desirable.

According to another aspect of the present disclosure, the article may be, without limitation, apparel, sporting equipment, or footwear. Alternatively, the article is component of apparel, sporting equipment, or footwear. The article of apparel or component of apparel may be a garment or a component of a garment. The component of the article of footwear may be an outsole, for example. As used herein, the terms "article of footwear" and "footwear" are intended to be used interchangeably to refer to the same article. Typically, the term "article of footwear" will be used in a first instance, and the term "footwear" may be subsequently used to refer to the same article for ease of readability.

An article of footwear or shoe may be designed for a variety of uses, such as sporting, athletic, military, work-related, recreational, or casual use. The article of footwear may be used outdoors on paved or unpaved surfaces (in part or in whole), such as on a ground surface including one or more of grass, turf, gravel, sand, dirt, clay, mud, and the like, intended for the performance of an athletic competition or as a general outdoor surface. The article of footwear may also be desirably used with indoor activities, such as indoor sports, shopping, and everyday work.

Figure 2A:
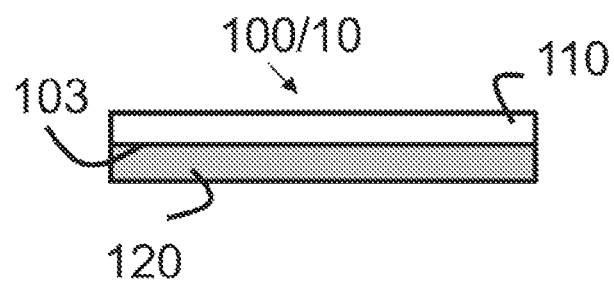
FIG. 2A is a cross-sectional schematic representation of an article formed according to the teachings of the present disclosure.

Referring now to FIG. 2A, an article 100 is shown that comprises, consists of, or consists essentially of textile 110 and a shaped portion of an ultraviolet (UV) radiation cured material 120 having a predetermined shape. The interface 103 located between the bonded UV radiation cured material 120 and the surface of the textile 110 may be substantially free of additional materials, including without limitation adhesive materials or primer materials.

Figure 2B:
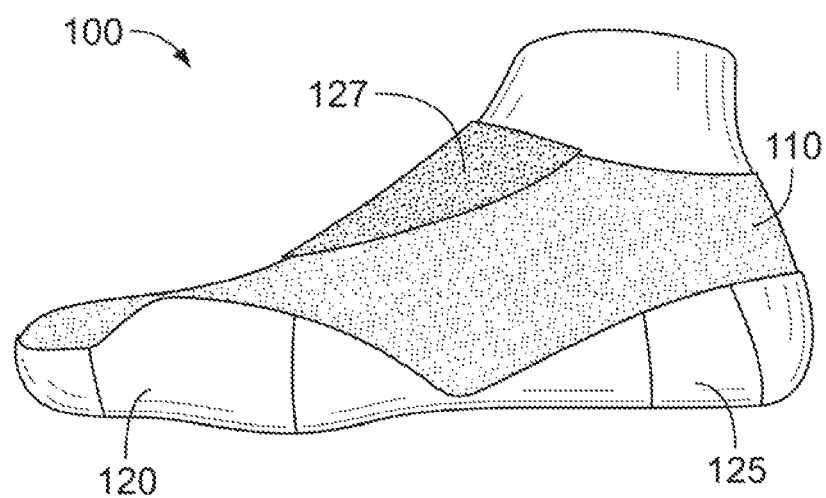
FIG. 2B is a perspective view of an article of footwear formed according to the teachings of the present disclosure.

As shown in FIG. 2B, when the article 100 is an article of footwear 100 or a shoe 100, the textile is an upper 110 for the article of footwear, a strobel for the article of footwear, or a combination of both the upper 110 and the strobel for the article of footwear. The UV radiation cured material 120 may be an outsole 120 or a component of the outsole or sole structure that is in contact with and attached or directly bonded 103 to the upper 110. At least part of the outsole 120 or sole structure of the article of footwear comprises the UV radiation curable material as described above and further defined herein in an uncured or partially cured state until cured by exposure to UV radiation resulting in a UV radiation cured material directly bonded to the upper 110.

Still referring to FIG. 2B, the outsole 120 refers to the very bottom of the shoe that is in direct contact with the ground. The outsole 120 may be relatively smooth or include one or more traction elements 125. These traction elements 125 may provide enhanced traction, as well as provide support or flexibility to the outsole and/or provide an aesthetic design or look to the shoe. The traction elements 125 may include, but are not limited to a tread pattern, as well cleats, studs, spikes, or similar elements configured to enhance traction for a wearer during cutting, turning, stopping, accelerating, and backward movement.

Since the outsole 120 is the outer most sole of the shoe, it is directly exposed to abrasion and wear. Various portions of the outsole 120 may be constructed with different thickness and exhibit different degrees of flexibility. The materials that comprise the outsole 120 should provide some degree of waterproofing, durability, and possess a coefficient of friction that is high enough to prevent slipping. In some cases two or more materials of different densities can be incorporated into the outsole 120 to give a hard wearing outer surface and a softer, more flexible midsole 130 for greater comfort. The outsole 120 may be a single layer or may contain multiple layers of the same or similar material, provided at least a portion of the outsole 120 comprises an UV radiation curable material. Alternatively, substantially all of the outsole comprises an UV radiation curable material.

The outsole 120 may be directly or otherwise operably secured to the upper 110 using any suitable mechanism or method. As used herein, the terms "operably secured to", such as for an outsole that is operably secured to an upper, refers collectively to direct connections, indirect connections, integral formations, and combinations thereof. For instance, for an outsole that is operably secured to an upper, the outsole can be directly connected to the upper (e.g., adhered directly thereto or glued with a cement or an adhesive), can be integrally formed with the upper (e.g., as a unitary component), and combinations thereof.

Still referring to FIG. 2B, the upper 110 of the footwear 100 has a body which may be fabricated from materials known in the art for making articles of footwear, and is configured to receive a user's foot. The upper 110 of a shoe consists of all components of the shoe above the outsole 120. The different components of the upper 110 may include a toe box, heal counter, and an Achilles notch, to name a few. These components are attached by stitches or more likely molded to become a single unit to which the outsole is attached.

The upper 110 or components of the upper 110 usually comprise a soft body made up of one or more lightweight materials. The materials used in the upper 110 provide stability, comfort, and a secure fit. For example, the upper may be made from or include one or more components made from one or more of natural or synthetic leather, a textile or both. The textile may include; a knit, braided, woven, or nonwoven textile made in whole or in part of a natural fiber; a knit, braided, woven or non-woven textile made in whole or in part of a synthetic polymer, a film of a synthetic polymer, etc.; and combinations thereof. The textile may include one or more natural or synthetic fibers or yarns. The synthetic yarns may comprise, consist of, or consist essentially of thermoplastic polyurethane (TPU), polyamide (e.g., Nylon®, etc.), polyester (e.g., polyethylene terephthalate or PET), polyolefin, or a mixture thereof.

The upper 110 and components of the upper 110 may be manufactured according to conventional techniques (e.g., molding, extrusion, thermoforming, stitching, knitting, etc.). While illustrated in FIG. 2B as a generic design, the upper 110 may alternatively have any desired aesthetic design, functional design, brand designators, or the like.

Still referring to FIG. 2B, the upper 110 may further comprise laces, flaps, straps, or other securing or foot engagement structures 127 used to securely hold the shoe 100 to a wearer's foot. A tongue member, bootie, or other similar type structure may be provided in or near the shoe instep area in order to increase comfort and/or to moderate the pressure or feel applied to the wearer's foot by any foot engagement structures 127.

When desirable, at least a portion of the upper 110 of the article of footwear, and in some embodiments substantially the entirety of the upper, may be formed of a knitted component. Thus the textile may be a knit textile with a circular knit textile being one specific example thereof. The knitted component may additionally or alternatively form another element of the article of footwear 110 such as the insole, for example.

The knitted component may have a first side forming an inner surface of the upper 110 (e.g., facing the void of the article of footwear 100) and a second side forming an outer surface of the upper 110. An upper 110 including the knitted component may substantially surround the void so as to substantially encompass the foot of a person when the article of footwear is in use. The first side and the second side of the knitted component may exhibit different characteristics (e.g., the first side may provide abrasion resistance and comfort while the second side may be relatively rigid and provide water resistance). The knitted component may be formed as an integral one-piece element during a knitting process, such as a weft knitting process (e.g., with a flat knitting machine or circular knitting machine), a warp knitting process, or any other suitable knitting process. That is, the knitting process may substantially form the knit structure of the knitted component without the need for significant post-knitting processes or steps. Alternatively, two or more portions of the knitted component may be formed separately and then attached. In some embodiments, the knitted component may be shaped after the knitting process to form and retain the desired shape of the upper (for example, by using a foot-shaped last). The shaping process may include attaching the knitted component to another object (e.g., a strobel) and/or attaching one portion of the knitted component to another portion of the knitted component at a seam by sewing, by using an adhesive, or by another suitable attachment process.

Forming the upper 110 with the knitted component may provide the upper 110 with advantageous characteristics including, but not limited to, a particular degree of elasticity (for example, as expressed in terms of Young's modulus), breathability, bendability, strength, moisture absorption, weight, and abrasion resistance. These characteristics may be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a monofilament material, or an elastic material such as spandex), by selecting yarns of a particular size (e.g., denier), or a combination thereof. The knitted component may also provide desirable aesthetic characteristics by incorporating yarns having different colors or other visual properties arranged in a particular pattern. The yarns and/or the knit structure of the knitted component may be varied at different locations such that the knitted component has two or more portions with different properties (e.g., a portion forming the throat area of the upper may be relatively elastic while another portion may be relatively inelastic). In some embodiments, the knitted component may incorporate one or more materials with properties that change in response to a stimulus (e.g., temperature, moisture, electrical current, magnetic field, or light). For example, the knitted component may include yarns formed of a thermoplastic polymer material (e.g., polyurethanes, polyamides, polyolefins, and nylons) that transitions from a solid state to a softened or liquid state when subjected to certain temperatures at or above its melting point and then transitions back to the solid state when cooled. The thermoplastic polymer material may provide the ability to heat and then cool a portion of the knitted component to thereby form an area of bonded or continuous material that exhibits certain advantageous properties including a relatively high degree of rigidity, strength, and water resistance, for example.

In some embodiments, the knitted component may include one or more yarns or strands that are at least partially inlaid or otherwise inserted within the knit structure of the knitted component during or after the knitting process, herein referred to as "tensile strands." The tensile strands may be substantially inelastic so as to have a substantially fixed length. The tensile strands may extend through a plurality of courses of the knitted component or through a passage within the knitted component and may limit the stretch of the knitted component in at least one direction. For example, the tensile strands may extend approximately from a biteline of the upper to a throat area of the upper to limit the stretch of the upper in the lateral direction. The tensile strands may form one or more lace apertures for receiving a lace and/or may extend around at least a portion of a lace aperture formed in the knit structure of the knitted component.

When desirable, the article of footwear 100 or shoe 100 may also include a platform upon which the foot will rest that separates the upper 110 from the foot of the person wearing the shoe. This platform is typically a separate removable board called an insole (not shown) that is made of cellulose or other materials, such as thermoplastic or thermoset elastomers, capable of providing a cushion between the ground and the foot of the person wearing the shoe 100. The insole may be treated with additives to inhibit bacterial growth. When desirable, the insole may be incorporated with, e.g., sewn into, the upper.

Referring once again to FIG. 2B, the outsole 120 of the shoe 100 may be engaged with or attached to the upper 110 being directly adhered thereto. However, when desirable, a portion of the outsole may be attached to the upper 110 through the use of additional means conventionally known or used in the construction of footwear 100, such as through the use of cements or adhesives, by mechanical connectors, and by sewing or stitching, to name a few.

Figure 3:
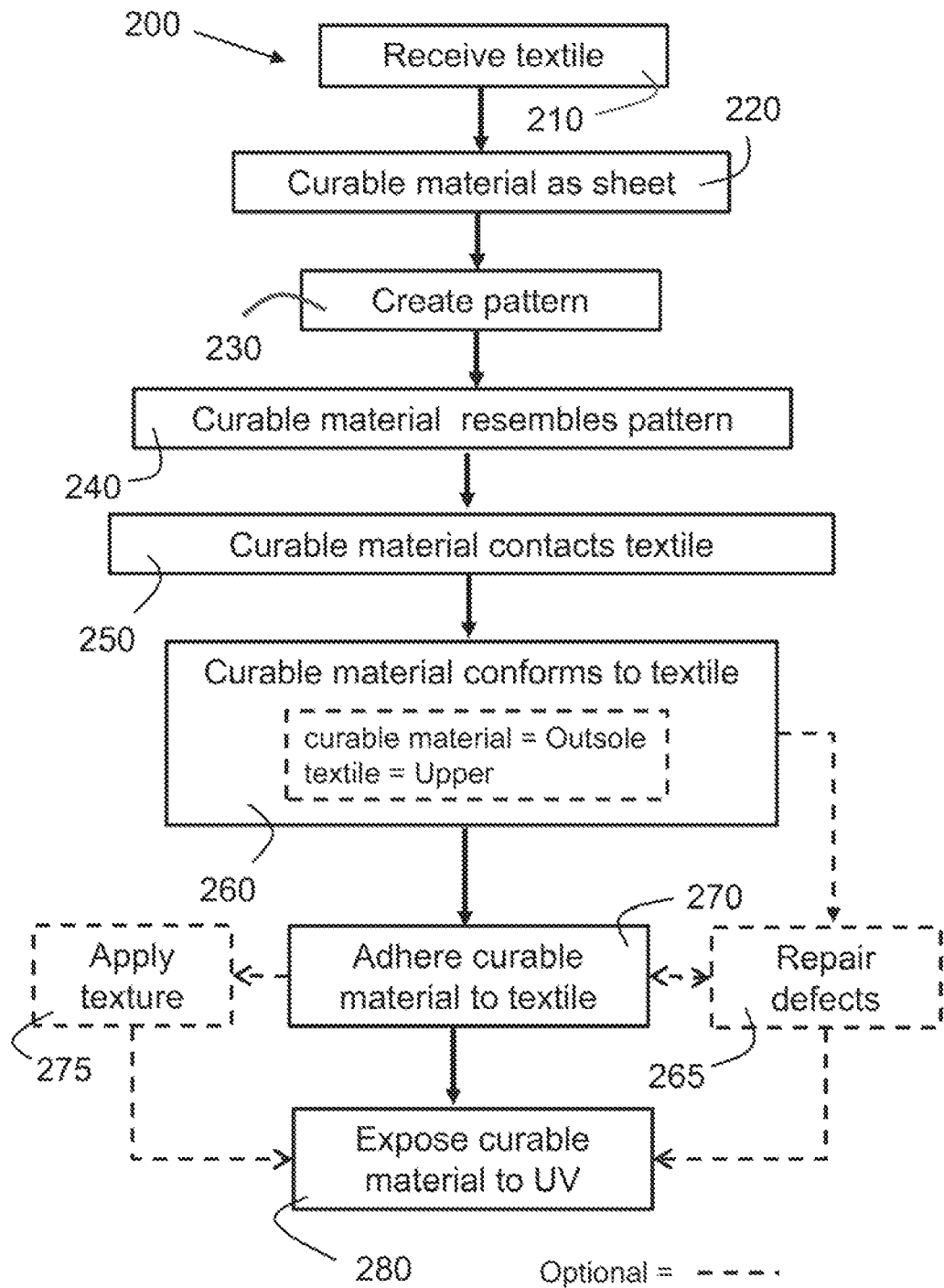
FIG. 3 is a flow chart of a method of forming an article of footwear according to the method of FIG. 1A.

Referring now to FIG. 3, a method of forming an article of footwear is provided that comprises, consists of, or consists essentially of the various steps and components used within the process or method previously described above in FIGS. 1A-1E, as well as any additional information subsequently provided below. This method 200 generally comprises receiving an upper 210, wherein the upper is formed of a textile that has a predetermined contour. Alternatively, the upper is a bootie or a sock. An ultraviolet radiation (UV) curable material is provided 220 in the form of one or more sheets. At least one pattern having a predetermined shape is created 230. The sheet of UV radiation curable material is altered 240, such that it resembles the shape of the pattern. The shaped UV radiation curable material is then placed 250 such that at least a portion of the UV radiation curable material is in direct contact with the textile of the upper. The shaped UV radiation curable material is then conformed 260 to the contour of the textile, thereby, forming the outsole for the article of footwear. The UV radiation curable material is adhered 270 to the textile and exposed 280 to ultraviolet radiation (UV).

The attachment of the upper to the outsole may comprise heating the outsole or midsole to a temperature from about 40° C. up to about 170° C. in order to soften the UV radiation curable material and/or exposing the outsole to ultraviolet (UV) radiation 280 in an amount and for a duration that is sufficient to at least partially cure the UV radiation curable material. Alternatively, the amount of and/or duration of UV exposure is sufficient to fully cure the UV radiation curable material. Typically, the UV radiation curable material is cooled below its softening temperature after or prior to being exposed to the ultraviolet (UV) radiation. In other words, the step of contouring and/or adhering the UV radiation curable material may be performed as the temperature of the UV radiation curable material is increased to a temperature at which the material softens, followed by decreasing the temperature of the UV radiation curable material below a softening point, with the decrease in the temperature occurring before or after the UV curing has been accomplished.

Still referring to FIG. 3, the strength of the attachment between the various components within the shoe may further be enhanced by applying an adhesive, a primer, or a combination thereof to a surface of one or more of the outsole or the upper 213. Another means of enhancing the adhesion between the various components within the shoe is to apply a texture to at least one surface of the outsole, such that the attachment of the outsole to the upper exhibits an increase in bond strength as compared to the same attachment made without the surface texture being present. The strength of the attachment of the outsole to the upper is such that the attachments exhibits a bond strength that is maintained after exposure to a force that is greater than or equal to 2.5 kgf/cm; alternatively, after exposure to a force of 3.0 kgf/cm or greater as measured according to the Bond Strength Testing Protocol described below.

A primer is a preparatory coating applied to the surface of a material (e.g., $1^{st}$ surface) prior to adhesion to another material (e.g., $2^{nd}$ surface) with or without an adhesive. A primer ensures better adhesion of the primed $1^{st}$ surface to a $2^{nd}$ surface, increases the durability of the bond between the $1^{st}$ and $2^{nd}$ surfaces, and provides additional protection for the material ($1^{st}$ surface) to which the primer was applied. The primer may include, without limitation, pre-polymer solutions or dispersions of epoxies, urethanes, acrylics, cyanoacrylates, silicones, and combinations thereof.

When present, the adhesive may include, but not be limited to epoxy adhesives, urethane adhesives, acrylic adhesives, cyanoacrylate adhesives, silicone adhesives, modified silane polymers, hot melt adhesives, contact glue (e.g., solvent-borne adhesive comprising natural or synthetic rubber resins with or without halogenation, such as polychloroprene, etc.) or combinations thereof. Alternatively, the adhesive is a thermoplastic polyurethane (TPU), a cyanoacrylate, an acrylic, a contact adhesive, a silicone a modified silane polymer, or a mixture thereof.

The UV radiation curable material incorporated as at least a portion of the component, such as an outsole, for example, may be an UV radiation curable elastomer as previously described above and further defined herein. Alternatively, the UV radiation curable material is an UV radiation curable polyurethane rubber. The UV radiation curable may further comprise a vulcanized rubber, such as a nitrile rubber or the like. The UV radiation curable material comprise a thermoset or a thermoplastic polymer, including but not limited to a polyurethane.

Figure 4A:
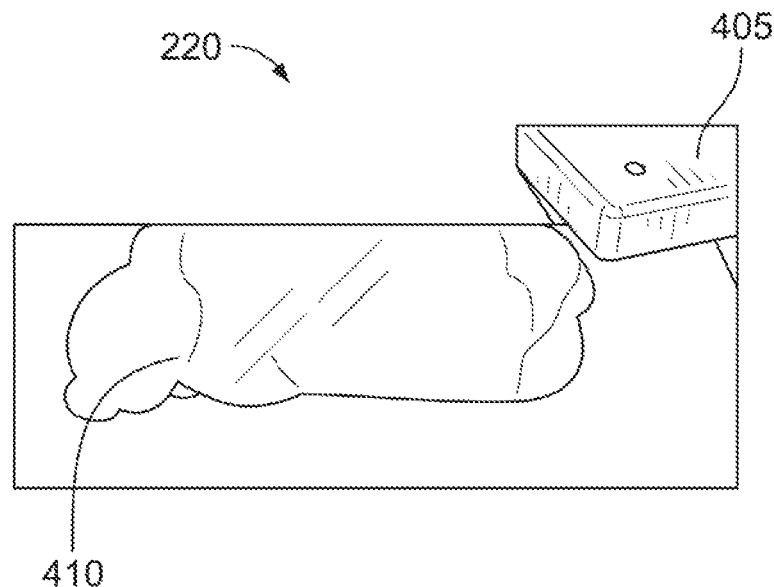
FIGS. 4A-4B are perspective views of providing an UV radiation curable material in the form of a sheet according to the method of FIG. 3.
Figure 4B:
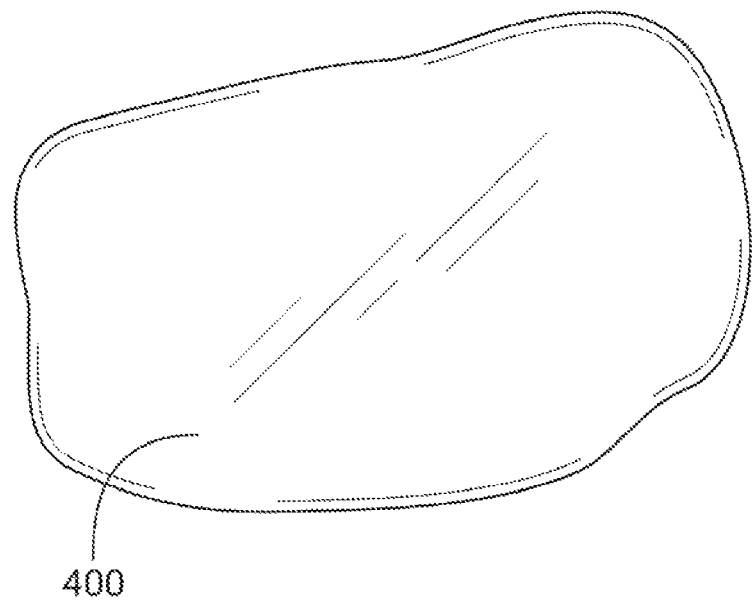
Figure 5A:
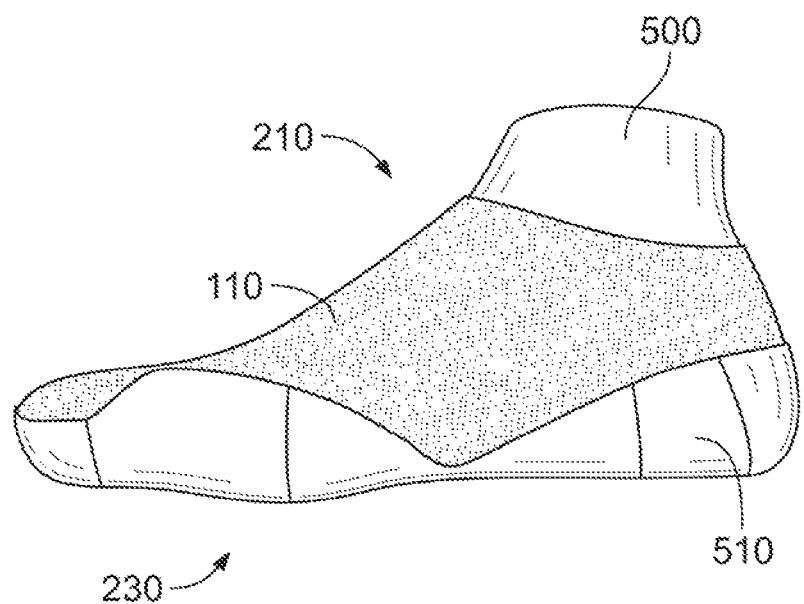
FIGS. 5A-5D are perspective views of creating at least one pattern having a predetermined shape according to the method of FIG. 3.
Figure 5B:
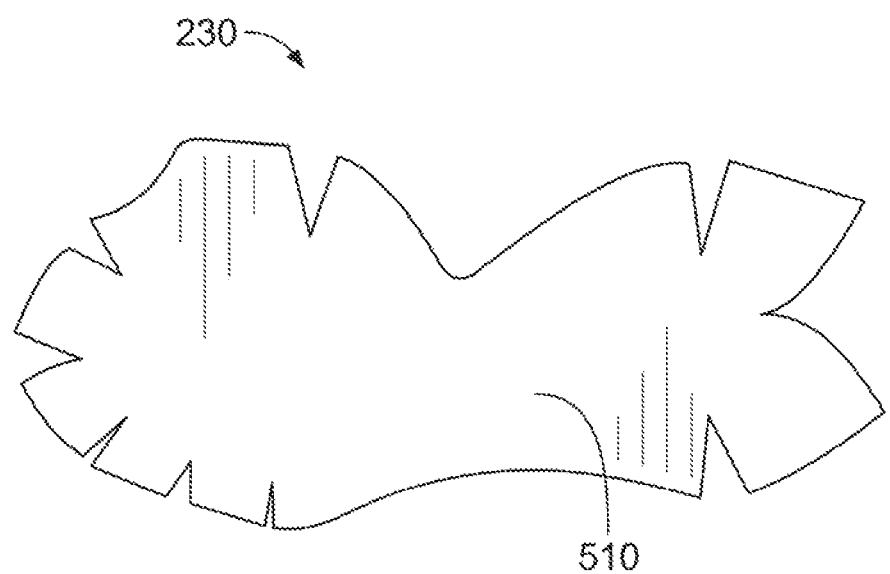
Figure 5C:
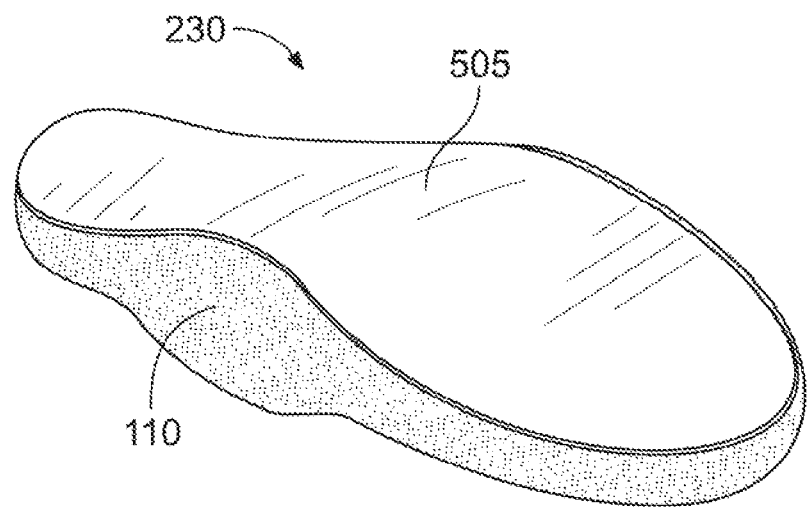
Figure 5D:
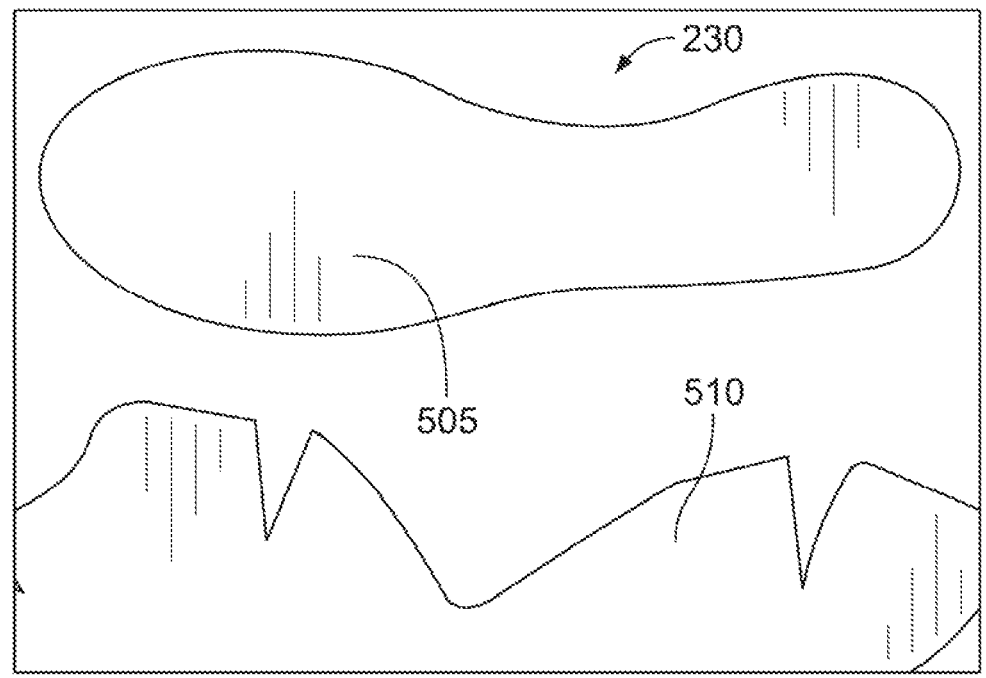

The following specific examples are provided to illustrate the individual steps in the process 200 of FIG. 3 used to form an article of footwear 100 shown in FIGS. 2A-B according to one aspect of the present disclosure. Referring now to FIGS. 4A and 4B, an UV radiation curable material is provided 220 in the form of one or more sheets 400, either by obtaining the sheet(s) preformed from a commercial source (not shown) or by preparing the sheet(s) 400 through the use of a press 405. In other words, As shown in FIGS. 4A and 4B, a predetermined amount of UV radiation curable material 410 is provided (see FIG. 4A) and then pressed into a sheet 400 having a predetermined thickness using heat, pressure, or a combination thereof (see FIG. 4B).

Referring now to FIGS. 5A to 5D, at least one upper formed of a textile having a contour is received 210 and at least one pattern having a predetermined shape is created 230. The upper 110 may be placed on a shoe last 500 to provide the desired contour. A first pattern 505 (see FIGS. 5B & 5D) and a second pattern 510 (see FIGS. 5A & 5D) may be formed that conforms to the shape predetermined by the shoe last 500 and upper 110. In this specific example, the patterns 505, 510 may be formed and shaped through the use tape that may be cut or trimmed. The shape of the first pattern 505 may be the underfoot area of the outsole in order to provide a pattern representing the core traction zone (see FIG. 5C). The shape of the second pattern 510 may provide a region that covers the underfoot area as well as a portion that wraps around for the sides of the upper 110 (see FIG. 5A). The second pattern 510 is removed from the upper 110 and flattened for use in shaping the UV radiation curable material (see FIG. 5B). The shape of the first pattern 505 and the second pattern 510 may be different (see FIG. 5D).

Figure 6A:
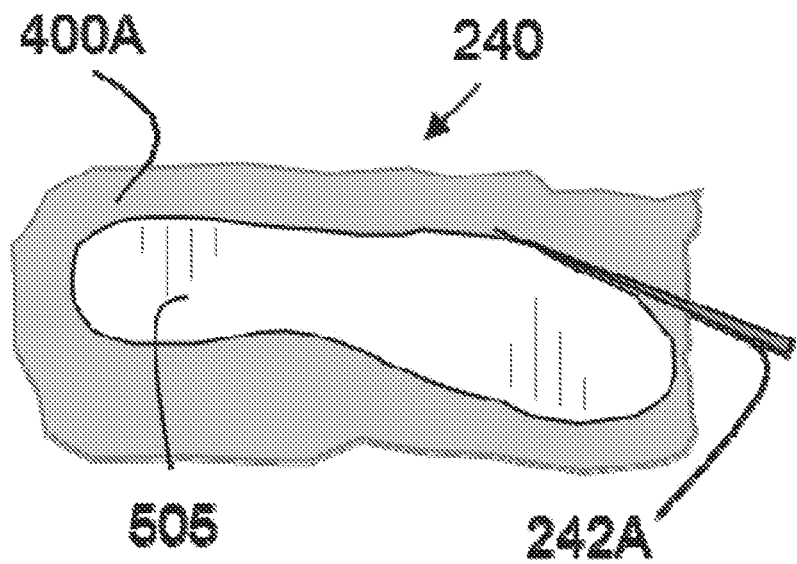
FIGS. 6A-6B are perspective views of altering the UV radiation curable material of FIGS. 4A-4B, such that it resembles the shape of the pattern of FIGS. 5A-5D according to the method of FIG. 3.
Figure 6B:
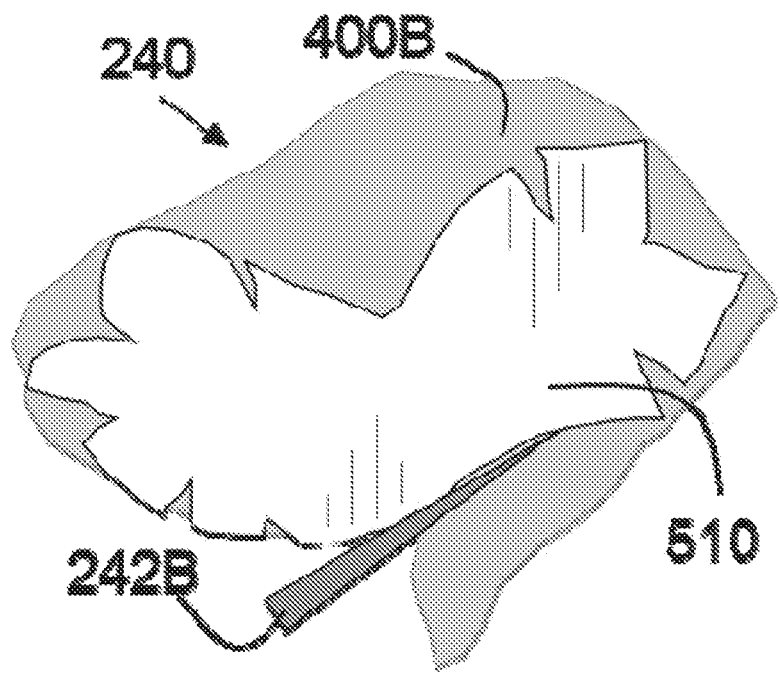

Referring now to FIGS. 6A and 6B, the sheet(s) of UV radiation curable material are altered 240 so that they resemble the shape of the pattern(s). In this example, a first sheet 400A of the UV radiation curable material is cut or trimmed to the shape of the first pattern 505 (see FIG. 6A). A second sheet 400B of the UV radiation curable material is cut or trimmed to the shape of the second pattern 510 (see FIG. 6B). The thickness of the first sheet 400A is selected such that it is larger than the thickness of the second sheet 400B. The thickness of the first sheet is generally selected such that it is between about 1.5 mm and about 3.0 mm, while the thickness of the second sheet is between about 0.5 mm and about 1.5 mm. In the specific example shown, the thickness of the first sheet was about 2 millimeters (mm), while the thickness of the second sheet was about 1 mm.

Figure 7A:
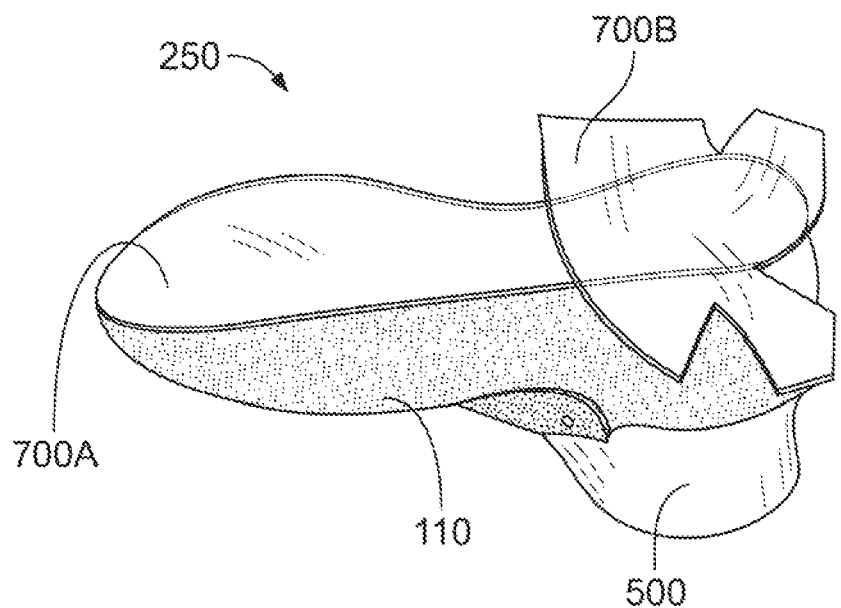
FIGS. 7A-7B are perspective views of placing the shaped UV radiation curable material of FIGS. 6A-6B in direct contact with the textile of the upper according to the method of FIG. 3.
Figure 7B:
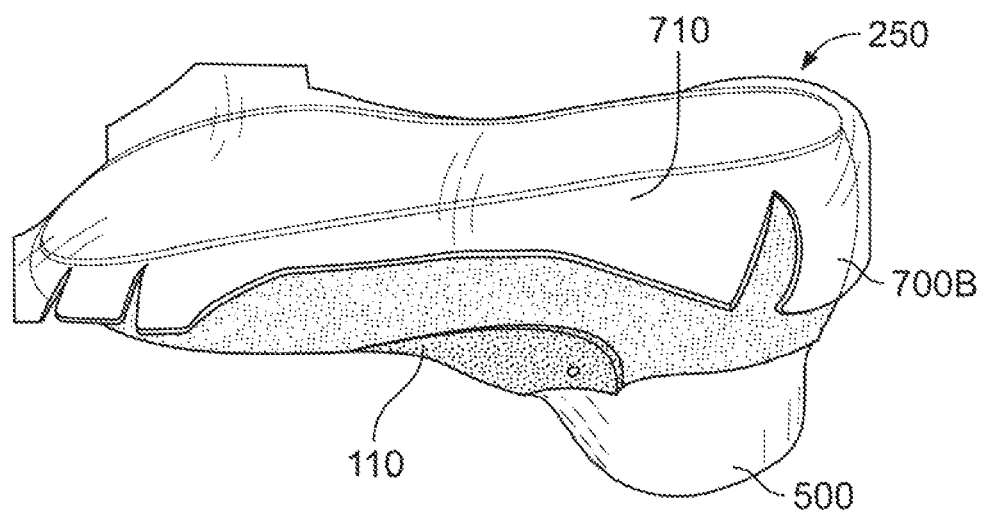
Figure 8A:
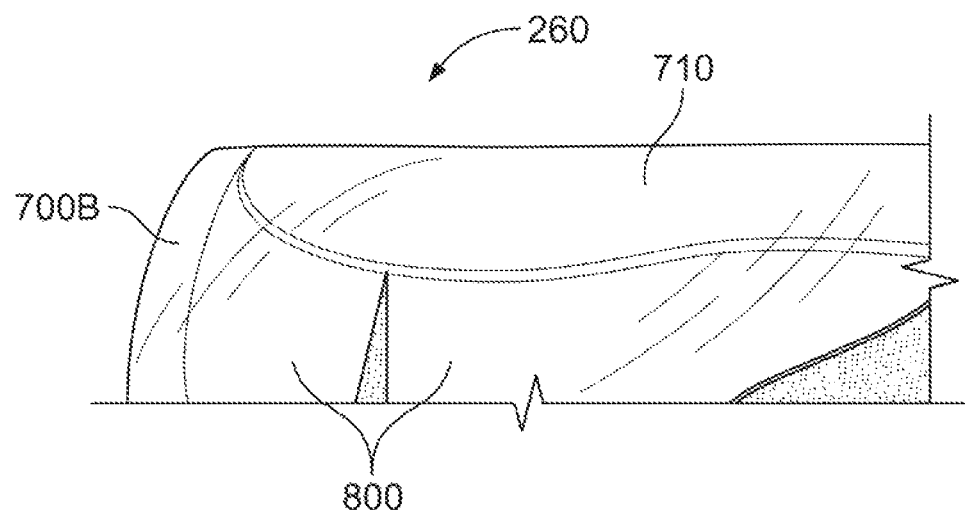
FIGS. 8A-8D are perspective views of conforming the shaped UV radiation curable material to the contour of the textile, such that the UV radiation curable material forms the outsole according to the method of FIG. 3.
Figure 8B:
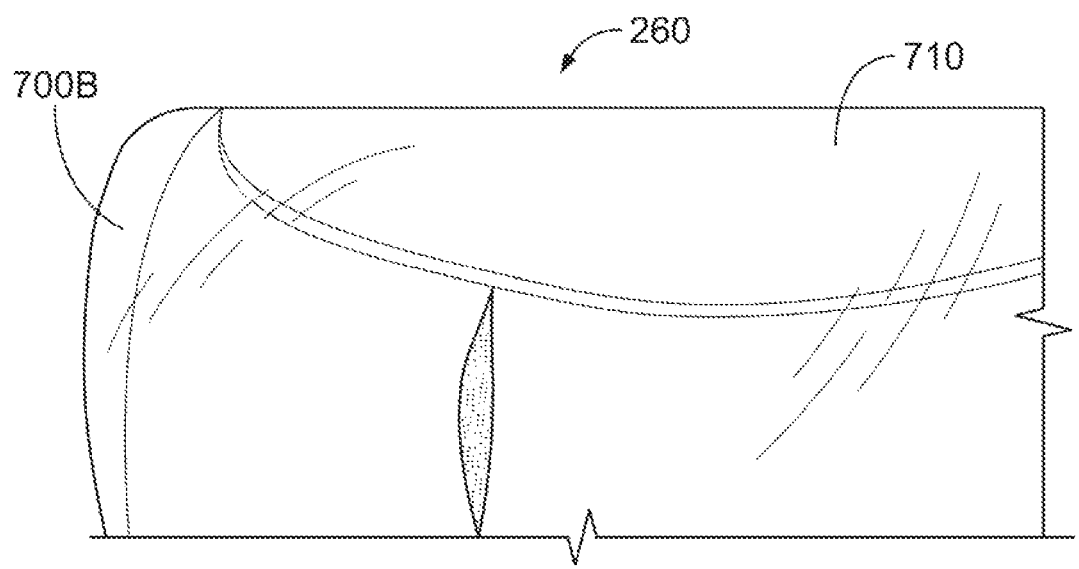
Figure 8C:
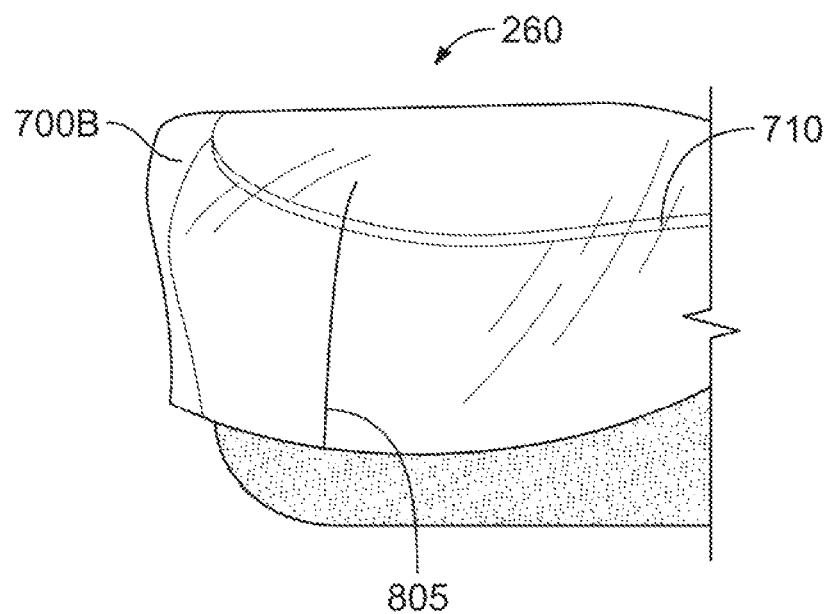
Figure 8D:
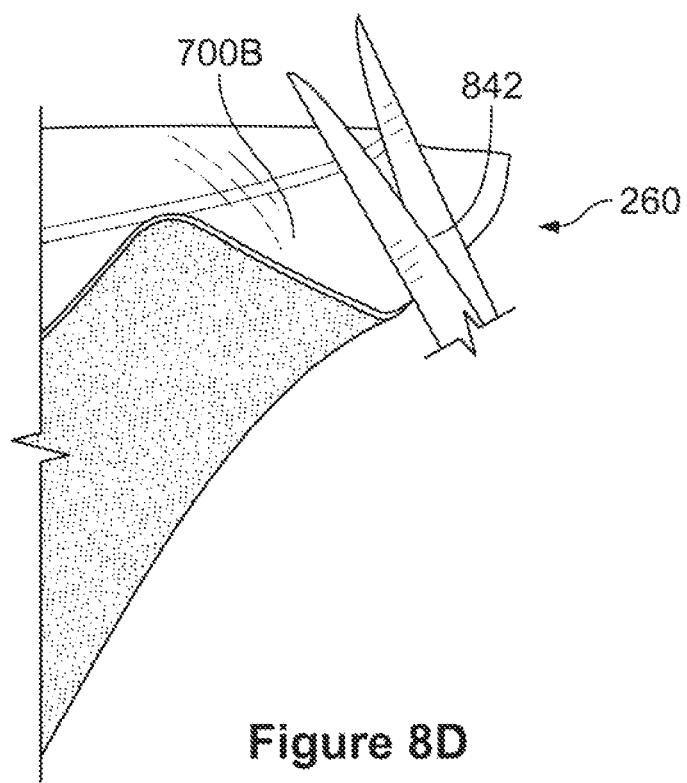
Figure 9A:
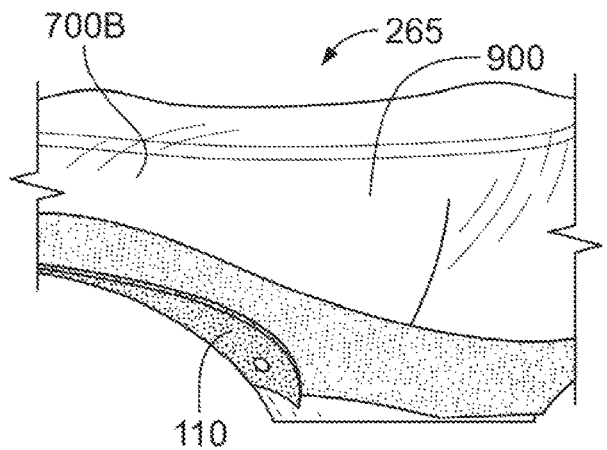
FIGS. 9A-9E are perspective views of repairing a defect in the shaped and contoured UV radiation curable material according to the method of FIG. 3.
Figure 9B:
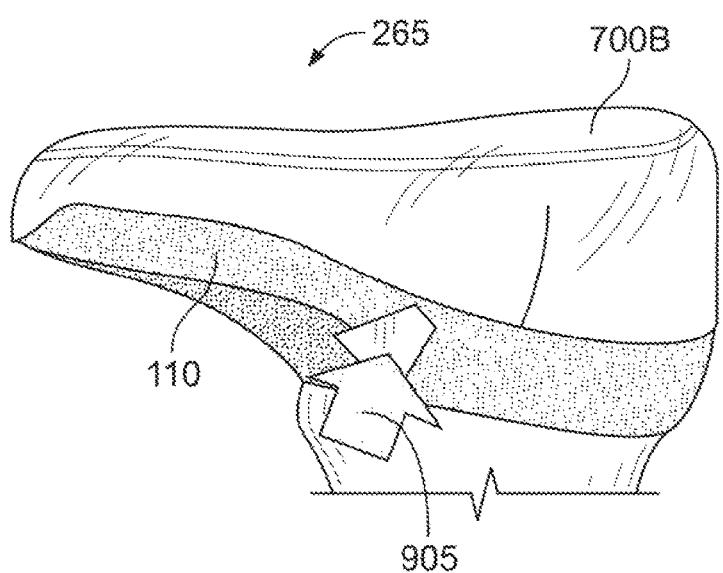
Figure 9C:
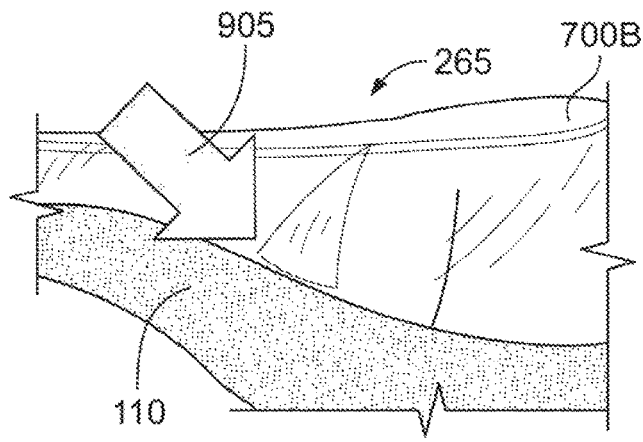
Figure 9D:
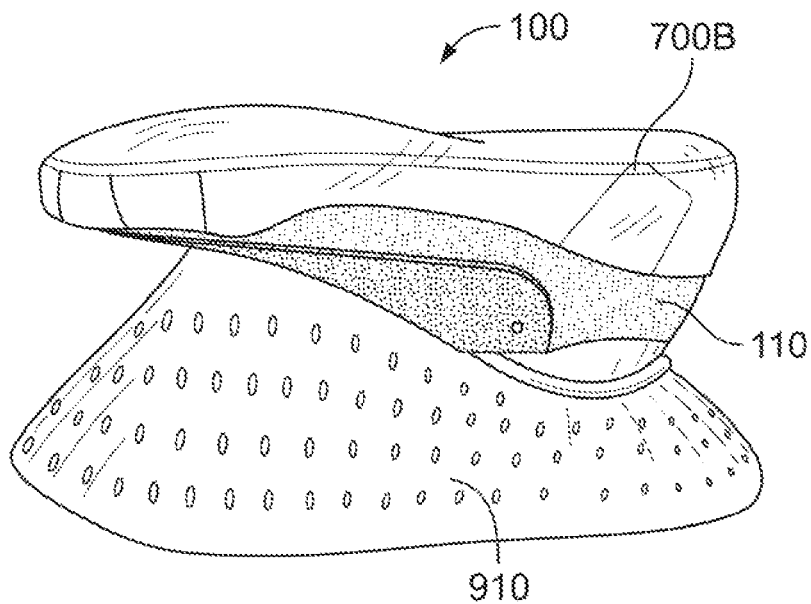
Figure 9E:
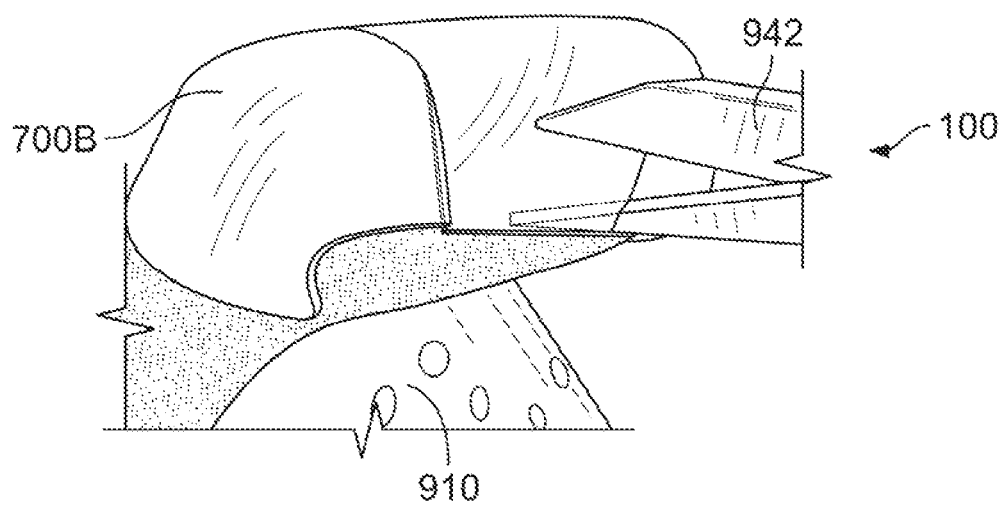
Figure 10A:
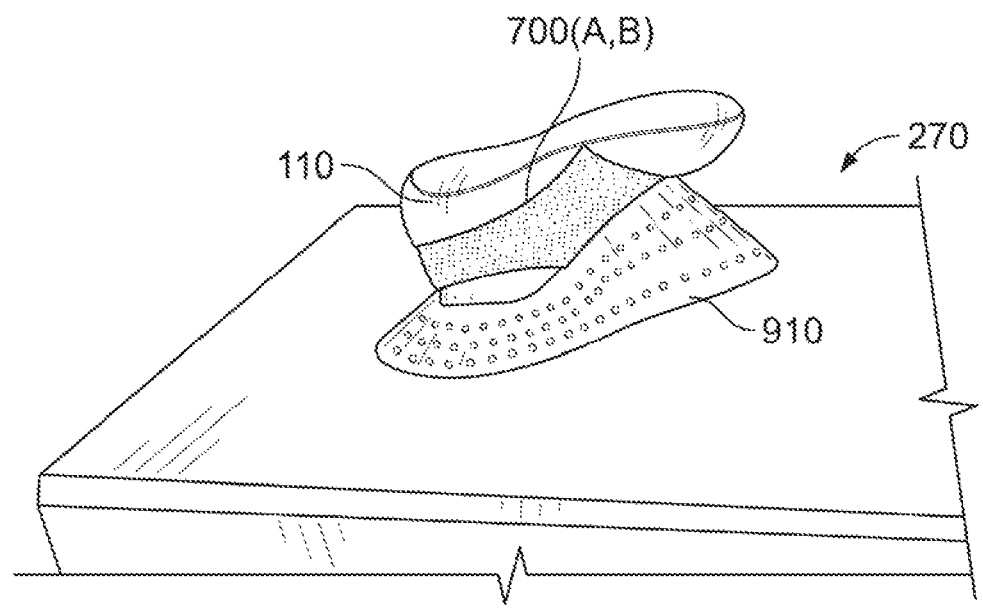
FIGS. 10A-10D are perspective views of adhering the UV radiation curable material to the textile according to the method of FIG. 3.
Figure 10B:
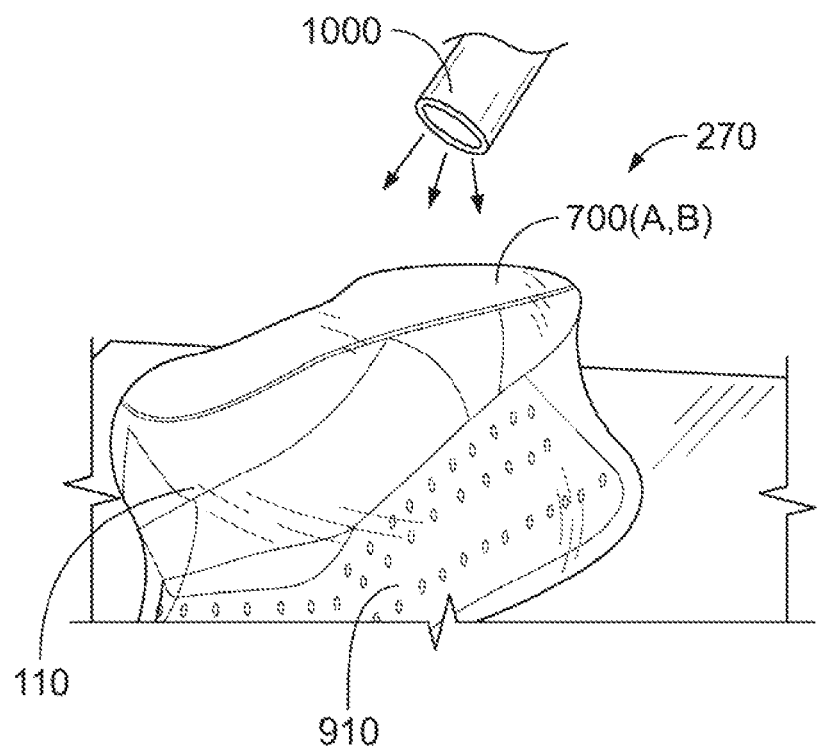
Figure 10C:
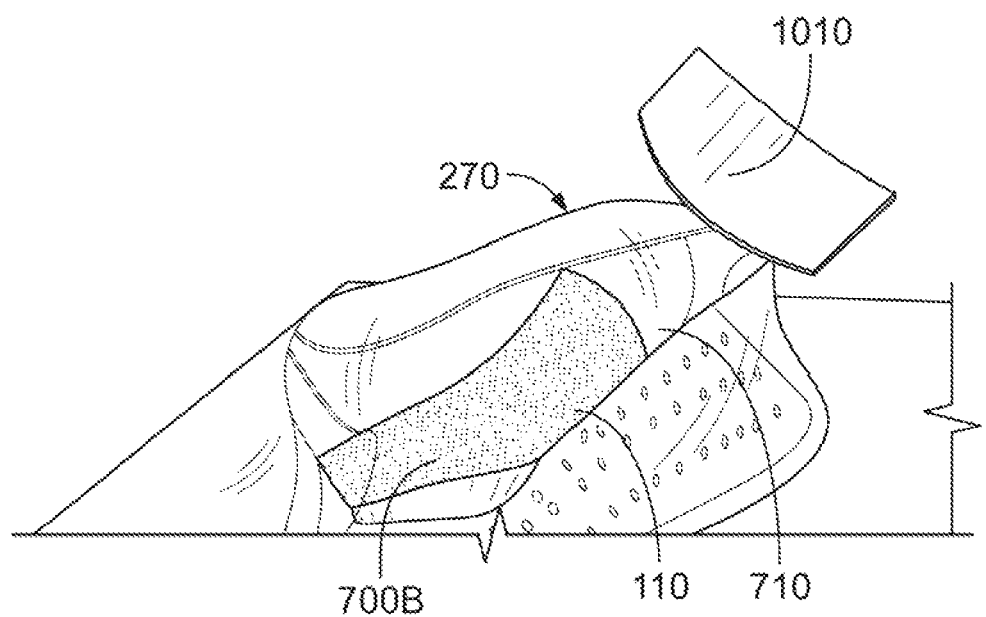
Figure 10D:
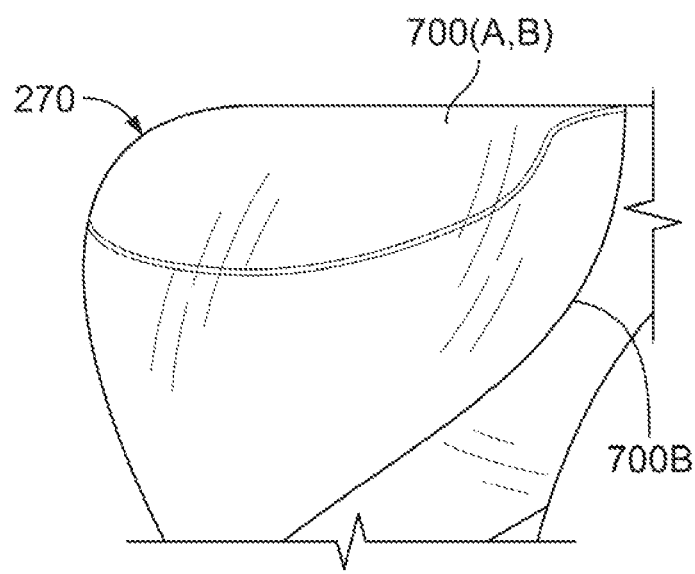

Referring now to FIGS. 7A and 7B, at least a portion of the shaped sheets of UV radiation curable material are placed into direct contact with the textile 250. In this specific example, the first shaped sheet 700A is placed onto the upper 110 positioned on the shoe last 500 having the desired contour. The first shaped sheet 770A has the shape associated with the underfoot area. The second shaped sheet 700B is stacked on top of the first shaped sheet 700A, such that this second sheet 700B also covers the underfoot area, but also occupies some of the area that wraps on the side of the upper 110. The surface area of the shaped second sheet 700B is larger than the surface area of the shaped first sheet 700A. Thus this second shaped sheet 700B will make direct contact with the upper 110 around the sides. A transition line 710, which represents the transition from the second shaped sheet 700B to where the first shaped sheet 700A and second shaped sheet 700B overlap, may be visible (see FIG. 7B).

Referring now to FIGS. 8A through 8E, the shaped UV radiation curable material is conformed to the contour of the textile 260. In this respect, various edges or darts 800 of the second shaped sheet of UV radiation curable material 700B may be pulled together (see FIG. 8A). The edges or darts 800 may also be pinched together (see FIG. 8B). When pinched together the darts 800 may begin to stick or adhere to one another. This adherence can further be enhanced by forming a press seam 805 between two darts (see FIG. 8C). Any excess UV radiation curable material may be trimmed or cut away at any place on the UV radiation curable material. Alternatively, the excess material is removed from the corners of the darts (see FIG. 8D). In areas of the sheet 700B having a large surface area, the application of heat may be used to soften the UV radiation curable material and to tack the material to the textile of the upper 110. Optionally, the UV radiation curable material and the textile may be subjected to a vacuum in order to provide more intimate contact between the UV radiation curable material and the textile of the upper. The heat source may include, but not be limited to, an iron 810 or a heated air dryer, to name a few.

Referring once again to FIG. 3, the may also include repairing 265 any defects that form in the shaped and/or contoured UV radiation curable material. As shown in FIGS. 9A through 9E, these defects may include, without limitation, a hole 900, a blemish, a scratch, an inclusion, or cloudiness in one of the shaped sheets 700B. The step of repairing 265 the defects may include identifying one or more defects 900 (see FIG. 9A), forming an appropriate patch 905 made from UV radiation curable material (see FIG. 9B); and applying the patch 905 to UV radiation curable sheet 700B to fix the defect 900 (see FIG. 9C). The article of footwear 100 may be placed onto a vacuum source 910 to further pull the UV radiation curable material sheet 700B into the textile of the upper 110 (see FIG. 9D). Any additional UV radiation curable material 700B may be trimmed or cut and inconsistencies corrected while the article 100 is on the vacuum source 910 (see FIG. 9E).

Referring now to FIGS. 10A through 10D, the UV radiation curable material may be adhered to the textile of the upper 270. The adherence between the UV radiation curable sheets 700A, 700B and the textile of the upper 110 may be enhanced through the use of a vacuum source 910 (see FIG. 10A). The application of heat using any known means, such as a hot air gun 1000, may soften the UV radiation curable material 700A, 700B and enhance contact with the textile of the upper 110 (see FIG. 10B). For the specific example, the visibility of the transition line 710 may be reduced or eliminated by blending the edge of the first sheet 700A with the second sheet 700B of UV radiation curable material (see FIG. 10C). This blending may be accomplished by any known means, including but not limited to the use of a rubber pad or a silicone pad 1010. When properly blended a smooth transition occurs between the first and second sheets of UV radiation curable material 700A, 700B (see FIG. 10D).

Figure 11A:
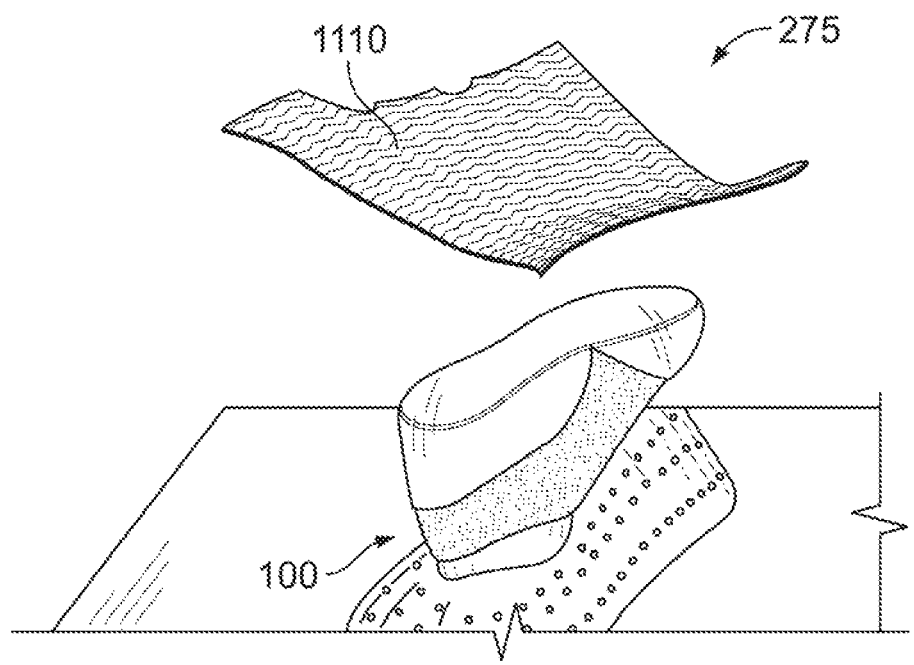
FIGS. 11A-11E are perspective views of applying a texture to the surface of the UV radiation curable material according to the method of FIG. 3.
Figure 11B:
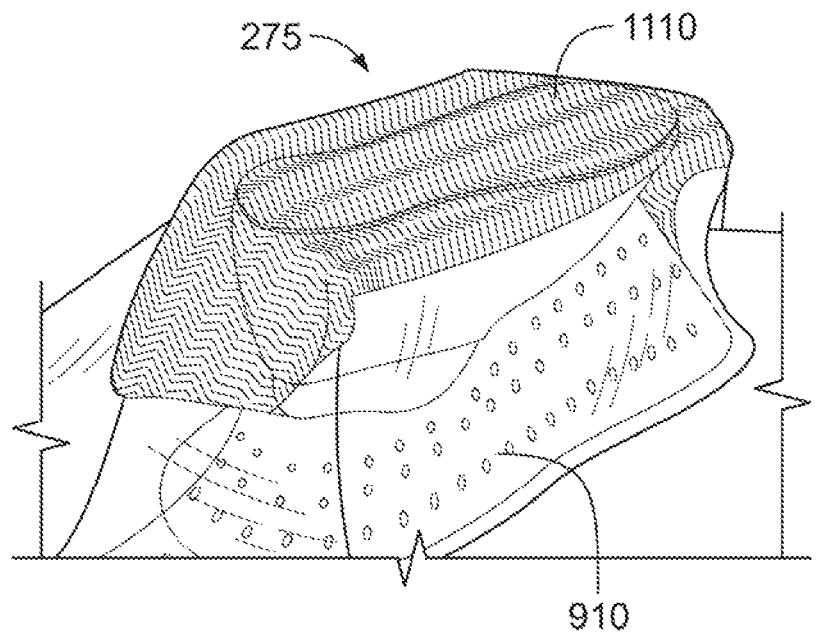
Figure 11C:
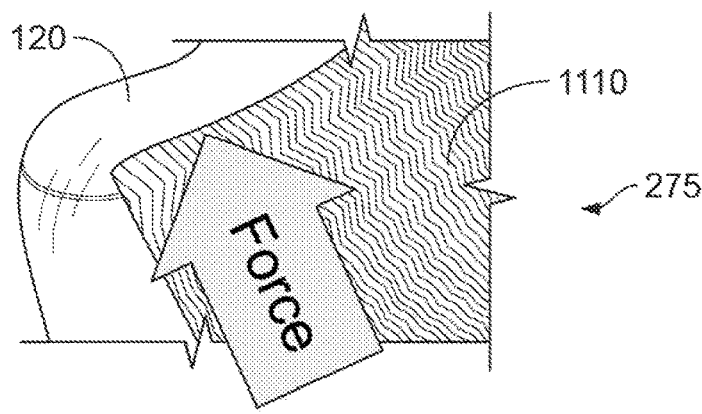
Figure 11D:
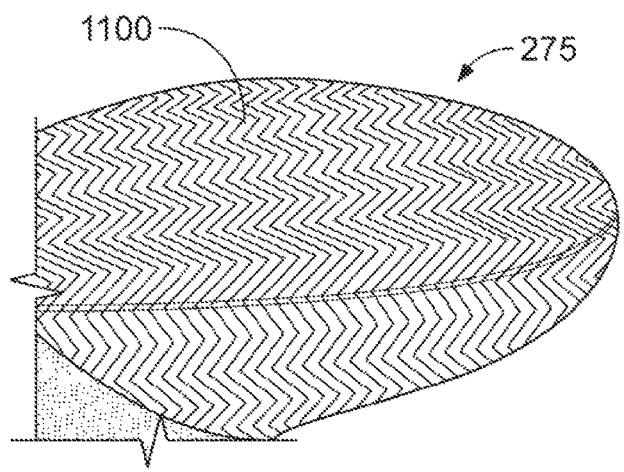
Figure 11E:
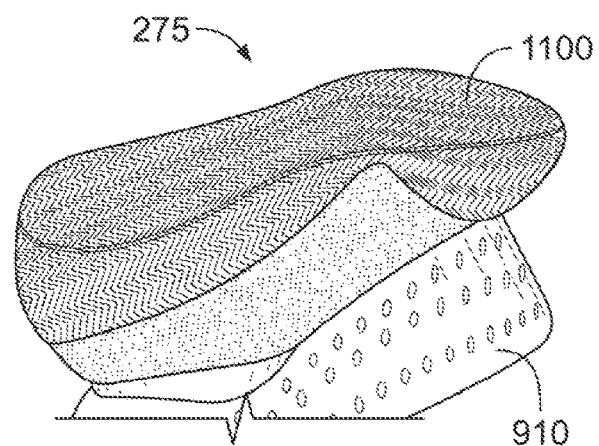

Referring once again to FIG. 3, the method 200 may further comprise applying a texture to a surface of the UV radiation curable material 275. Thus a pattern may be applied to at least one surface of the outsole. This texture may be applied to the surface of the UV radiation curable material after the UV radiation curable material is adhered to the textile 270 and prior to being exposed to UV radiation 280. As shown in FIGS. 11A through 11E, the texture 1100 may be applied to the UV radiation curable material placing a tool 1110, such as an elastomeric or rubber sheet, upon which the pattern resides in contact with the UV radiation curable material contoured in the desired shape of the article 100 (see FIG. 11A). When desirable this pattern may be a tread pattern 1100. A vacuum source may be used to pull the shape of the texture of the elastomeric sheet 1110 into UV radiation curable material (see FIG. 11B). When desirable this texture 1100 may provide a pattern, such as a tread pattern. The shape of the texture of the elastomeric sheet 1110 may also be pushed into the UV radiation curable material 120 through the application of an additional force (see FIG. 11C). The texture 1100 is shown in FIGS. 11D and 11E in the shape of a tread pattern to be located on the area of the UV radiation curable material that is under the foot and will make contact with the ground surface during use.

Referring once again to FIG. 3, the UV radiation curable material is exposed to UV radiation 280. The UV radiation curable material 120 adhered to the upper 110 is at least partially cured, thereby, resulting in the creation of the article of footwear 100 as shown in FIGS. 2A-2B. According to another aspect of the present disclosure, the method 200 may further comprise finishing an article of footwear by exposing 280 the outsole to UV radiation, such that the outsole is fully cured. Other finishing operations, as previously described above may also be performed upon the shoe without exceeding the scope of the present disclosure.

The following specific examples are given to illustrate the attachment between the UV radiation curable material and the textile of the Upper in the article of footwear, formed according to the teachings of the present disclosure, as well as the bond strength formed there between, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Bond Strength Testing Protocol

A bonding test is performed with the purpose of evaluating the strength of the adhesion bond along an interface of the UV radiation cured material and another material. For example, the adhesion bond can be a bond between an outsole and an upper of an article of footwear. In this test a flat component (e.g., a textile) is placed in contact with an UV radiation curable material on a flat surface, and then a compressive force of at least 2 kgf/cm$^2$ is applied to the combination of the component and the UV radiation curable material, leaving an edge region of the component and an opposing edge region of the UV radiation curable material which are not in contact or compressed. Following the compression, the combination of the component and the UV radiation curable material is then exposed UV radiation in an amount and for a duration that is sufficient to fully cure the UV radiation curable material, forming a composite sheet including the edge regions. The composite sheet is then cut into strips to form test specimens, with each test specimen including a length of the edge regions for grasping in a test apparatus capable of measuring applied force, such as an Instron testing system. Each strip has a width of 25.4 cm (1 inch). Intervals are marked along the length of the strips with each interval being spaced apart by 2 cm. Depending upon the length of the strips, between 2 and 5 intervals may be marked on each strip. The edge of textile and the UV radiation curable material of a molded specimen are then grasped at an edge region by the testing apparatus. The tabs are then pulled with an increasing amount of force until the surfaces of the textile and the UV radiation curable material are separated over the length of at least one interval. The amount of force required to separate the surfaces of the textile and the UV radiation curable material is measured by the testing apparatus. In order for a specimen to be considered as passing the bonding test, a minimum force of 2.5 kgf/cm force is required to separate the bonded surfaces of the component and the UV radiation cured material.

Example 1—Bonding Performance

UV radiation curable polyurethane rubber (Millathane® UV, TSE Industries Inc., Clearwater, Fla.) was attached using a compression molding process to a knit textile formed of TPU coated yarn (Runs A & B) manufactured by Sambu Fine Chemicals, Korea and to a knit textile formed of uncoated PET yarn (Runs C & D) manufactured by Unifi, Inc. (Greensboro, N.C., USA). The combinations of the UV radiation curable polyurethane rubber and knit textiles were then exposed to UV light, fully curing the UV radiation curable polyurethane rubber. Each of the four cured samples was prepared and tested twice (Tests 1 & 2) according to the Bond Strength Testing Protocol described above. The measured test results are summarized in Table 1.

| UV radiation curable Table 1 - Bonding Test Results | | | | |
|---|---|---|---|---|
| Run No. | Description | Test 1 (kgf/cm) | Test 2 (kgf/cm) | Pass/Fail (≥2.5 kgf/cm) |
| A | UV radiation curable cured polyurethane rubber w/TPU coated yarn | 3.4 | 3.4 | PASS |
| B | UV radiation curable cured polyurethane rubber w/TPU coated yarn | 3.4 | 3.8 | PASS |
| C | UV radiation curable cured polyurethane rubber w/ uncoated PET yarn | Tab broke at 2.9 | Tab broke at 2.9 | PASS |
| D | UV radiation curable cured polyurethane rubber w/ uncoated PET yarn | 3.1 | 3.5 | PASS |

This example demonstrates that the UV radiation curable polyurethane rubber can be attached to a textile with the bond strength necessary to be used as an outsole in an article of footwear. More specifically, Runs A-D maintained their bond after application of a 2.5 kgf/cm force in the Bond Strength Test, and more than a 2.9 kgf/cm force was necessary to break the bonds.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject matter of the disclosure may also relate, among others, to the following aspects:

1. A method of forming an article, the method comprising:
shaping one or more pieces of an ultraviolet radiation (UV) curable material;
placing the shaped UV radiation curable material in direct contact with a surface of a textile;
using heat or pressure or both, adhering the shaped UV radiation curable material to the surface of the textile; and
curing at least a portion of the shaped UV radiation curable material adhered to the surface of the textile by exposing the shaped UV radiation curable material to ultraviolet radiation, thereby forming an article comprising UV radiation cured material bonded to the surface of the textile.

2. The method of Aspect 1, wherein the shaping one or more pieces of the UV radiation curable material comprises providing one or more pieces of the UV radiation curable material, and shaping the UV radiation curable material such that it resembles a pattern.

3. The method of Aspect 2, wherein the pattern has a predetermined shape.

4. The method of any one of Aspects 1 to 3, wherein, following the curing, a bond strength of the UV radiation cured material bonded to the textile is at least 10% greater than a bond strength of the shaped UV radiation curable material adhered to the textile prior to the curing.

5. The method of any one of Aspects 1 to 4, wherein, following the adhering, an interface between the adhered UV radiation curable material and the surface of a textile is substantially free of additional materials.

6. The method of Aspect 5, wherein the interface between the adhered UV radiation curable material and the surface of the textile is substantially free of additional adhesive materials.

7. The method of any of Aspects 1 to 6, wherein the method further comprises repairing any defects in the shaped or contoured UV radiation curable material.

8. The method of any of Aspects 1 to 7, wherein the method further comprises protecting the UV radiation curable material from the ultraviolet radiation during one or more steps of the method.

9. The method of any of Aspects 1 to 9, wherein the method further comprises applying a texture to a surface of the one or more pieces of UV radiation curable material, to the shaped UV radiation curable material, to the adhered UV radiation curable material, or any combination thereof, prior to the curing.

10. The method of Aspect 9, wherein the surface is an outer surface.

11. The method of any of Aspects 1 to 10, wherein the UV radiation cured material forms at least a portion of an exterior surface of the article.

12. The method of any of Aspects 1 to 11, wherein the shaping the UV radiation curable material comprises:
providing a predetermined amount of the UV radiation curable material; and
extruding, molding, or pressing the UV radiation curable material into the one or more flat pieces using heat, pressure, or a combination thereof.

13. The method of Aspects 1 to 11, wherein the shaping the UV radiation curable material includes extruding, molding or pressing the UV radiation curable material to form a sheet having a thickness from about 0.5 millimeters (mm) to about 3 mm.

14. The method of any one of Aspects 1-13, wherein the method further comprises, prior to the curing, contouring the shaped UV radiation curable material or contouring the adhered UV radiation curable material, or both.

15. The method of Aspect 14, wherein the step of contouring comprises placing a first combination of the shaped UV radiation curable material and the textile on a contoured mechanical form, or placing a second combination of the adhered UV radiation curable material and the textile on a contoured mechanical form, and the curing comprises exposing the at least a portion of the UV radiation curable material to the ultraviolet radiation while the first or second combination is on the contoured mechanical form.

16. The method of any of Aspects 14 or 15, wherein the step of contouring comprises at least one selected from the group consisting of pulling ends of the shaped UV radiation curable material or the adhered UV radiation curable material together, pinching ends of the shaped UV radiation curable material or the adhered UV radiation curable material together; press seaming ends of the shaped UV radiation curable material or the adhered UV radiation curable material together; trimming away any excess shaped UV radiation curable material or adhered UV radiation curable material, and combinations thereof.

17. The method of any of Aspects 1 to 16, wherein the step of adhering the shaped UV radiation curable material to the textile comprises increasing a temperature of at least a portion of the shaped UV radiation curable material while the shaped UV radiation curable material is in contact with the textile.

18. The method of any of Aspects 1 to 17, wherein the step of adhering the shaped UV radiation curable material to the textile comprises subjecting at least a portion of the shaped UV radiation curable material to increased pressure or a vacuum while the shaped UV radiation curable material is in contact with the textile.

19. The method of Aspect 7, wherein the step of repairing any defects in the shaped UV radiation curable material comprises:
  identifying one or more defects;
  forming a patch made of the UV radiation curable material; and
  applying the patch to the defect.

20. The method of Aspect 9, wherein the applying the texture to the surface of the adhered UV radiation curable material occurs after the adhering.

21. The method of any of Aspects 9 or 20, wherein applying the texture to the surface of the one or more pieces of UV radiation curable material, to the shaped UV radiation curable material, to the adhered UV radiation curable material, or any combination thereof, comprises:
  providing a textured element having a textured surface;
  placing the textured surface of the textured element in contact with the surface of the one or more pieces of UV radiation curable material, to the shaped UV radiation curable material, to the adhered UV radiation curable material, or any combination thereof;
  pulling the shape of the texture into the surface of the one or more pieces of UV radiation curable material, to the shaped UV radiation curable material, to the adhered UV radiation curable material, or any combination thereof; and
  optionally, applying a further force to push the shape of the texture into the surface of the one or more pieces of UV radiation curable material, to the shaped UV radiation curable material, to the adhered UV radiation curable material, or any combination thereof.

22. The method of Aspect 21, wherein the textured element is an elastomeric sheet, a release paper, the surface of a mold, or an elastomeric element that fits over and at least partially encloses the combination of the textile and the shaped UV radiation curable material.

23. The method of any of Aspects 1 to 22, wherein the UV radiation curable material is exposed to ultraviolet (UV) radiation in an amount and for a duration that is sufficient to partially cure the UV radiation curable material.

24. The method of any of Aspects 1 to 23, wherein the UV radiation curable material is exposed to ultraviolet (UV) radiation in an amount and for a duration that is sufficient to fully cure the UV radiation curable material.

25. The method of any of Aspects 1 to 24, wherein the UV radiation curable material is provided as at least a first flat piece and a second flat piece, wherein the thickness of the first flat piece is greater than the thickness of the second flat piece.

26. The method of Aspect 25, wherein a surface area of the second flat piece is greater than a surface area of the first flat piece.

27. The method of any of Aspects 25 or 26, wherein a first surface of the first flat piece is placed in direct contact with the surface of the textile, and the second flat piece is placed on top of the first flat piece.

28. The method of Aspect 27, wherein a first surface of the second flat piece is placed in direct contact with a second surface of the first flat piece, the second surface of the first flat piece being opposite the first surface of the first flat piece.

29. The method of Aspect 28, wherein a second surface of the second flat piece forms at least a portion of an outer surface of the article, the second surface of the second flat piece being opposite the first surface of the second flat piece.

30. The method of any of Aspects 2 to 28, wherein the step of determining the pattern comprises creating a first pattern and a second pattern; wherein the first pattern is different from the second pattern.

31. The method of Aspect 29, wherein the first flat piece of UV radiation curable material is shaped to resemble the first pattern and the second flat piece of UV radiation curable material is shaped to resemble the second pattern.

32. The method of any of Aspects 25 to 30, wherein the first flat piece of UV radiation curable material is placed in contact with the textile forming a first layer and the second flat piece of UV radiation curable material is placed such that a portion of the second flat piece covers at least part of the first layer, thereby, forming a second layer.

33. The method of Aspect 31, wherein, at least part of the second layer makes direct contact with the textile.

34. The method of any of Aspects 31 or 32, wherein one or more edges of the first layer are blended together with the second layer, such that a smooth transition exists between the first and second layers.

35. The method of any of Aspects 1 to 33, wherein the article is a garment or a component of a garment.

36. The method of any of Aspects 1 to 33, wherein the article is an article of sporting equipment or a component of an article of sporting equipment.

37. The method of any of Aspects 1 to 33, wherein the article is an article of footwear or a component of an article of footwear.

38. The method of Aspect 36, wherein the article is a component of the article of footwear.

39. The method of Aspect 36, wherein the textile is an upper for the article of footwear, a strobel for the article of footwear, or is a combination of both the upper and the strobel for the article of footwear, and the UV radiation cured material bonded to the textile is an outsole or a component of a sole structure of the article of footwear.

40. The method of Aspect 37, wherein the component of the article of footwear is an outsole.

41. The method of Aspect 36, wherein the article is an article of footwear.

42. The method of any of Aspects 1 to 40, wherein the textile includes a knit textile, a woven textile, a non-woven textile, a braided textile, or any combination thereof.

43. The method of Aspect 41, wherein the knit textile is a circular knit textile.

44. The method of Aspect 42, wherein the circular knit textile is an upper for the article of footwear or a portion of an upper for the article of footwear.

45. The method of any of Aspects 1-43, wherein the method further comprises placing the textile or the combination of the UV radiation curable material and the textile onto a contoured mechanical form.

46. The method of Aspect 44, wherein the contoured mechanical form is a shoe last.

47. The method of any of Aspects 1 to 45, wherein the method further comprises placing a textured element in contact with an outer surface of the UV radiation curable material prior to the curing.

48. The method of Aspect 46, wherein the method further comprises removing the textured element after at least partially curing the UV radiation curable material.

49. The method of any of Aspects 46 or 47, wherein placing the textured element in contact with the outer surface of the UV radiation curable material comprises placing an elastomeric element over at least a portion of the UV radiation curable material and the textile.

50. The method of Aspect 48, wherein the method further comprises removing the elastomeric element after adhering the UV radiation curable material to the textile, or after at least partially curing the UV radiation curable material.

51. The method of any of Aspects 1 to 50, wherein the UV radiation curable material includes an UV radiation curable elastomer.

52. The method of any of Aspects 1 to 50, wherein the UV radiation curable material includes a UV radiation curable millable polyurethane gum.

53. The method of any of Aspects 1 to 51 wherein the UV radiation curable material further comprises one or more photoinitiators.

54. The method of any of Aspects 1 to 52, wherein the UV radiation curable material further comprises one or more processing aids.

55. The method of Aspect 46, wherein the textured element includes a tread pattern.

56. The method of Aspect 25, wherein the thickness of the second piece is between about 1.5 mm and about 3.0 mm, while the thickness of the first piece is between about 0.5 mm and about 1.5 mm.

57. The method of Aspect 50, wherein the UV radiation curable elastomer comprises a rubber.

58. The method of Aspect 52, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.

59. The method of Aspect 53, wherein the processing aids are independently selected from the group of plasticizers, mold release agents, lubricants, antioxidants, flame retardants, dyes, pigments, reinforcing and non-reinforcing fillers, fiber reinforcements, and light stabilizers.

60. The method of Aspect 41, wherein the textile includes one or more natural or synthetic fibers or yarns.

61. The method of Aspect 59, wherein the synthetic yarns comprise a thermoplastic polyurethane (TPU), a polyamide, a polyester, a polyolefin, or a mixture thereof.

62. The method of Aspect 38, wherein the method further comprises applying an adhesive, a primer, or a combination thereof to a surface of the upper or the outsole.

63. The method of Aspect 61, wherein the adhesive comprises a thermoplastic polyurethane (TPU), a cyanoacrylate, an acrylic, a contact adhesive, a silicone a modified silane polymer, or a mixture thereof.

64. The method of Aspect 61, wherein the primer comprises a pre-polymer solution or dispersion of an epoxy, urethane, acrylic, cyanoacrylate, silicone, or a combination thereof.

65. The method of Aspect 38, wherein the method further comprises placing an insole within the upper.

66. The method of any of Aspects 1 to 64, wherein the UV radiation cured material is bonded to the textile, such that a bond strength is maintained after exposure to a force of up to at least 2.5 kgf/cm as measured according to the Bond Strength Testing Protocol.

67. An article of footwear having an upper and an outsole, the article of footwear being formed according to the method of any of Aspects 1-65.

68. An article of footwear comprising:
an upper formed of a textile and having a predetermined contour; and
an outsole having a predetermined shape; the outsole comprising an UV radiation curable material in an uncured or partially cured state, the outsole being attached to the upper.

69. The article of footwear of Aspect 67, wherein the upper comprises an elastomeric element that fits over and at least partially encloses the combination of the textile and the shaped UV radiation curable material.

70. The article of footwear of any of Aspects 67 or 68, wherein the article of footwear further comprises an insole located within the upper.

71. The article of footwear of any of Aspects 67 to 69, wherein the UV radiation curable material comprises an UV radiation curable elastomer.

72. The article of footwear of any of Aspects 67 to 70, wherein the UV radiation curable material further comprises one or more photoinitiators and/or other processing aids.

73. The article of footwear of any of Aspects 67 to 71, wherein at least one surface of the outsole has a tread pattern.

74. The article of footwear of any of Aspects 67 to 72, wherein the upper comprises a knit textile, a woven textile, a non-woven textile, a braided textile, or any combination thereof.

75. The article of footwear of any of Aspects 67 to 73, wherein the article of footwear further comprises an adhesive, a primer, or a combination thereof located on a surface of the upper or the outsole.

76. The article of footwear of any of Aspects 67 to 74, wherein the outsole is bonded to the upper, such that a bond strength is maintained after exposure to a force of at least 2.5 kgf/cm as measured according to the Bond Strength Testing Protocol.

77. An article comprising:
a textile; and a shaped portion of an ultraviolet (UV) radiation cured material;

wherein the UV radiation cured material is directly bonded to a surface of the textile.

78. The article of Aspect 76, wherein the UV radiation cured material is shaped such that it resembles a pattern.

79. The article of Aspect 77, wherein the pattern has a predetermined shape.

80. The article of any of Aspects 76 to 79, wherein an interface between the bonded UV radiation cured material and the surface of the textile is substantially free of additional materials.

81. The article of Aspect 79, wherein the interface between the bonded UV radiation cured material and the surface of the textile is substantially free of additional adhesive materials.

82. The article of any of Aspects 76 to 80, wherein the article further comprises a texture on a surface of the shaped portion of the UV radiation cured material.

83. The article of Aspect 81, wherein the textured surface is an outer surface.

84. The article of any of Aspects 76 to 82, wherein the portion of the UV radiation cured material forms at least a portion of an exterior surface of the article.

85. The article of any of Aspects 76 to 83, wherein the article is an article of footwear, an article of apparel, an article of sporting equipment, or a component of the article of footwear, apparel, or sporting equipment.

86. The article of Aspect 84, wherein the article is a component of the article of footwear.

87. The article of Aspect 84, wherein the textile is an upper for the article of footwear, a strobel for the article of footwear, or a combination of both the upper and the strobel for the article of footwear; and the UV radiation cured material bonded to the textile is an outsole or a component of a sole structure of the article of footwear.

88. The article of any of Aspects 76 to 86, wherein the UV radiation cured material includes an elastomer.

89. The article of any of Aspects 76 to 87, wherein the UV radiation cured material is a thermoplastic polyurethane (TPU).

90. An article of footwear that comprises a component of the article of any of claims 76 to 88.

91. A method of finishing an article of footwear having an upper and an outsole; the method comprising:

providing the article of footwear of any of claims 67 to 75; and exposing the outsole in the article of footwear to ultraviolet (UV) radiation, such that the outsole is fully cured.

92. The method of Aspect 90, wherein the UV irradiation results from an UV light that transmits a wavelength of light that is the same as the excitation wavelength exhibited by a photoinitiator present in the outsole.

93. The method of Aspect 91, wherein the wavelength transmitted by the UV light is in the range of about 180 nm to about 400 nm.

94. An article or a component of an article that is formed according to the method of any of Aspects 1 to 65.

95. A method of manufacturing an article of footwear, apparel, or sporting equipment; the method comprising:

providing a first article of any of Aspects 66 to 89;
providing a second component; and
combining the first article with the second component to form the article of footwear, apparel, or sporting equipment.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of forming an article, the method comprising:

disposing a plurality of pieces of an ultraviolet (UV) radiation curable material onto a molding surface to form a first shape including an inner surface and an outer surface, wherein the UV radiation curable material includes a UV radiation curable millable polyurethane gum;

placing a surface of a textile into direct contact with the inner surface of the first shape comprising the plurality of pieces of the UV radiation curable material;

using heat or heat and pressure, molding the textile and the first shape comprising the plurality of pieces of the UV radiation curable material to a second shape corresponding to the molding surface and adhering the inner surface of the first shape comprising the plurality of pieces of UV radiation curable material to the surface of the textile; and curing, after removing heat or heat and pressure, all of the pieces of the UV radiation curable material adhered to the surface of the textile by exposing the pieces of the shaped UV radiation curable material to ultraviolet radiation, thereby forming an article comprising pieces of the UV radiation cured material bonded to the surface of the textile.

2. The method of claim 1, wherein the article is a component of an article of footwear, a component of an article of apparel, or a component of an article of sporting equipment.

3. The method of claim 2, wherein the article is the component of the article of footwear.

4. The method of claim 3, wherein the UV radiation cured material bonded to the surface of the textile is an outsole or a component of a sole structure of the article of footwear, and an outer surface of the UV radiation cured material bonded to the surface of the textile includes a tread pattern.

5. The method of claim 1, wherein the article is a component of the article of footwear or is an article of footwear.

6. The method of claim 5, wherein the textile is an upper for the article of footwear, a strobel for the article of footwear, or a combination of both the upper and the strobel for the article of footwear, and the adhered UV radiation cured material bonded to the textile is an outsole or a component of a sole structure of the article of footwear.

7. The method of claim 5, wherein the molding surface is a shoe last.

8. The method of claim 1, wherein the UV radiation cured material forms at least a portion of an exterior surface of the article.

9. The method of claim 8, wherein the UV radiation cured material forming at least a portion of an exterior surface of the article includes a tread pattern.

10. The method of claim 1, wherein, following the adhering, an interface between the adhered UV radiation curable material and the surface of a textile is substantially free of additional materials.

11. The method of claim 1, wherein the method further comprises applying a texture to a surface of the plurality of pieces of UV radiation curable material, to the second shape corresponding to the molding surface, to the adhered inner surface of the first shape, or any combination thereof, prior to the curing.

12. The method of claim 1, wherein the method further comprises, prior to the curing, contouring the second shape corresponding to the molding surface or contouring the adhered inner surface of the first shape, or both.

13. The method of claim 1, wherein, following the adhering, an interface between the adhered UV radiation curable material and the surface of a textile is substantially free of additional adhesive materials.

14. The method of claim 1, wherein the method further comprises protecting the UV radiation curable material from the UV radiation during one or more steps of the method.

15. The method of claim 1, wherein the article is an article of footwear, an article of apparel, or an article of sporting equipment.

16. The method of claim 1, wherein the textile includes a knit textile, a woven textile, a non-woven textile, a braided textile, or any combination thereof.

17. The method of claim 1, wherein the molding surface comprises a contoured mechanical form.

\* \* \* \* \*